United States Patent
Suzuki et al.

(10) Patent No.: US 8,285,913 B2
(45) Date of Patent: Oct. 9, 2012

(54) STORAGE APPARATUS AND INTERFACE EXPANSION AUTHENTICATION METHOD THEREFOR

(75) Inventors: Akifumi Suzuki, Yokohama (JP); Hiroshi Hirayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 389 days.

(21) Appl. No.: 12/664,305

(22) PCT Filed: Oct. 22, 2009

(86) PCT No.: PCT/JP2009/005537
§ 371 (c)(1),
(2), (4) Date: Dec. 11, 2009

(87) PCT Pub. No.: WO2011/048630
PCT Pub. Date: Apr. 28, 2011

(65) Prior Publication Data
US 2011/0197011 A1    Aug. 11, 2011

(51) Int. Cl.
*G06F 13/00* (2006.01)
*G06F 13/36* (2006.01)
(52) U.S. Cl. ......... 710/316; 710/104; 710/306; 710/311
(58) Field of Classification Search ............... 710/74, 710/300, 305–306, 311–314, 316–317, 104, 710/200
See application file for complete search history.

(56) References Cited

U.S. PATENT DOCUMENTS

| | | | |
|---|---|---|---|
| 6,947,939 B2 * | 9/2005 | Fujibayashi et al. | 701/469 |
| 8,031,722 B1 * | 10/2011 | Sanville et al. | 370/395.7 |
| 2003/0140128 A1 * | 7/2003 | Cox et al. | 709/221 |
| 2003/0158966 A1 | 8/2003 | Sato | |
| 2006/0134936 A1 | 6/2006 | Sullivan et al. | |
| 2008/0104360 A1 * | 5/2008 | Takeuchi et al. | 711/203 |
| 2009/0106579 A1 * | 4/2009 | Takuwa et al. | 714/4 |
| 2009/0271418 A1 * | 10/2009 | Vaghani et al. | 707/100 |

FOREIGN PATENT DOCUMENTS
EP    1 367 781 A2    12/2003

OTHER PUBLICATIONS

International Search Report on International Application No. PCT/JP2009/005537 mailed Jun. 2, 2010; 4 pages.
American National Standard of Accredited Standards Committee NCITS T11/Project 1508-D/Rev. 6.3; Fibre Channel, Switch Fabric—3 (FC-SW-3),Rev 6.3; Feb. 19, 2003; 258 pages.
Introduction to the EMC CLARiiON CX4 Series Featuring UltraFlex Technology, Applied Technology, Dec. 2009, pp. 1-27.

* cited by examiner

*Primary Examiner* — Thomas J Cleary
(74) *Attorney, Agent, or Firm* — Foley & Lardner LLP

(57) ABSTRACT

Degradation of data transfer performance is restrained during data transfer for mirroring between first and second controllers.
The first and second controllers are connected with a first path for connecting a second port of a first switch unit on the first controller to a second port of a first switch unit on the second controller, and with a second path independent of the first path, for connecting a second port of a second switch unit on the first controller to a second port of a second switch unit on the second controller.

13 Claims, 15 Drawing Sheets

FIG.12A

| \multicolumn{3}{c}{FIRST SYSTEM CONFIGURATION RULE} |||
|---|---|---|
| SW | Port | I/O |
| SW00 | P00 | Host I/O |
|  | P01 | Drv I/O |
| SW01 | P02 | Drv I/O |
|  | P03 | Host I/O |
| SW10 | P10 | Host I/O |
|  | P11 | Drv I/O |
| SW11 | P12 | Drv I/O |
|  | P13 | Host I/O |

FIG.12B

| SW | Port | I/O |
|---|---|---|
| | \multicolumn{2}{c}{SECOND SYSTEM CONFIGURATION RULE} |
| SW00 | P00 | Host I/O |
| | P01 | Host I/O |
| SW01 | P02 | Drv I/O |
| | P03 | Drv I/O |
| SW10 | P10 | Host I/O |
| | P11 | Host I/O |
| SW11 | P12 | Drv I/O |
| | P13 | Drv I/O |

FIG.12C

| \multicolumn{3}{c}{THIRD SYSTEM CONFIGURATION RULE} |||
|---|---|---|
| SW | Port | I/O |
| SW00 | P00 | Host I/O |
|  | P01 | Host I/O |
| SW01 | P02 | Drv I/O |
|  | P03 | Drv I/O |
| SW10 | P10 | Drv I/O |
|  | P11 | Drv I/O |
| SW11 | P12 | Host I/O |
|  | P13 | Host I/O |

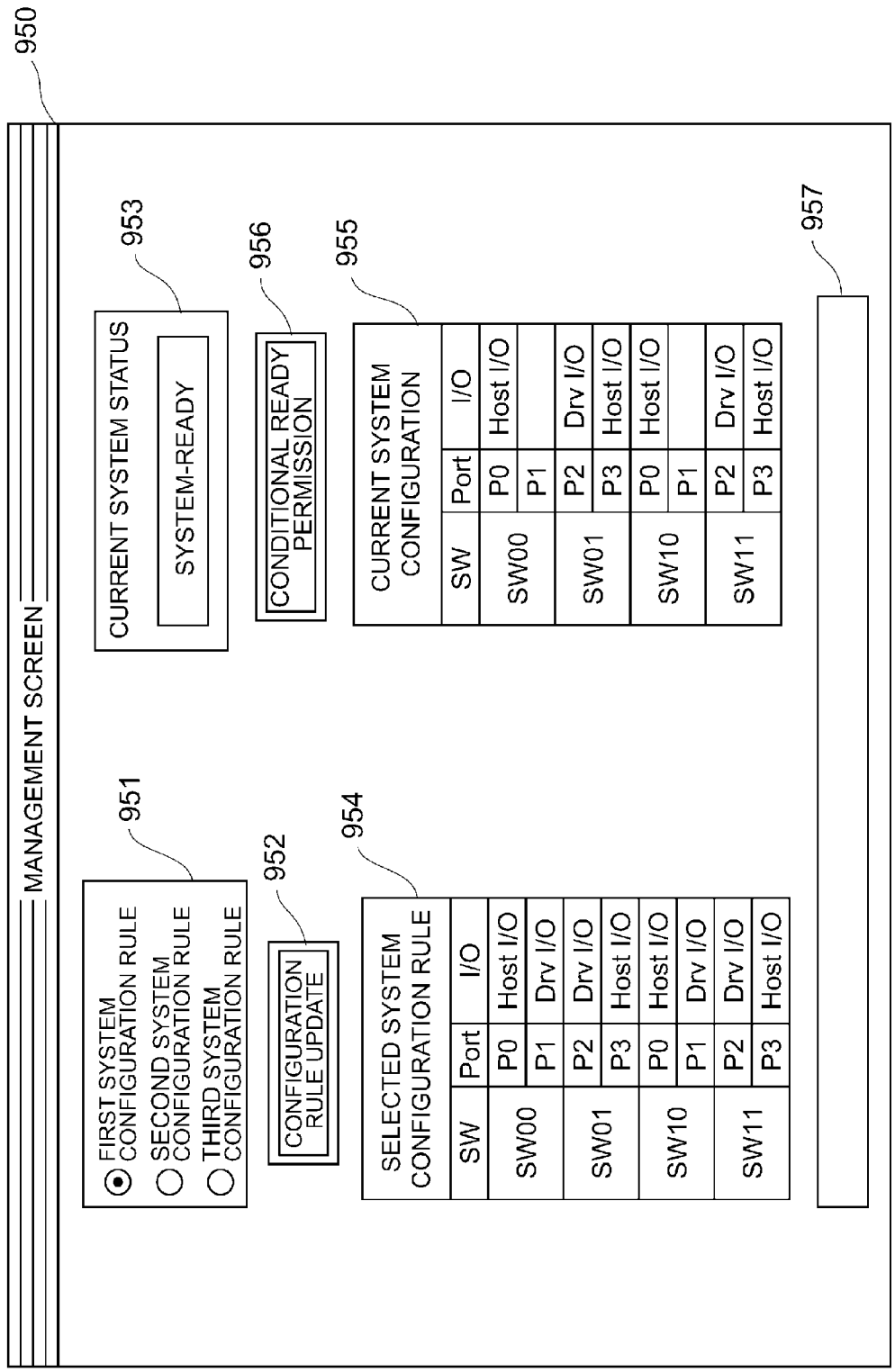

STORAGE APPARATUS AND INTERFACE EXPANSION AUTHENTICATION METHOD THEREFOR

TECHNICAL FIELD

The present invention relates to a storage apparatus equipped with a plurality of switch units with a plurality of ports for adding interfaces with at least one of a host system and storage device, and the invention is ideal for use in, for example, a storage apparatus and interface expansion authentication method capable of changing the connection configuration of the interfaces.

BACKGROUND ART

Various systems have been developed using databases along with the development of the information industry in recent years. In a storage apparatus for storing databases, communication between a host system such as a so-called open system or mainframe, and storage devices such as hard disk drives is performed via a controller having a cache, a processor, and interfaces with the host system and the storage device.

Each interface unit for performing communication with the host system and the storage devices have been fixed on a side of the controller. Recently, there is a technology in capable of flexibly changing the input/output (hereinafter, sometimes called "I/O") configuration in the storage apparatus with the arrangement to modulize these interface units and configure the modulized interface units being mountable and dismountable to the controller (see Non-Patent Literature 1).

As an example of such module configuration mountable and dismountable to the controller, there is a configuration in which I/O modules and a controller body are connected to each other and which enables connection of various kinds of I/O modules by adopting, for example, PCI-Express for connecting the I/O modules. A storage apparatus capable of flexibly adding or changing an interface unit by inserting or removing I/O modules, using the above-described technique, has been provided (see Patent Literature 1).

CITATION LIST

Non Patent Literature

NPL 1: "Introduction to the EMC CLARiiON CX4 Series Featuring UltraFlex Technology, Applied Technology, December 2009, pgs. 1-27.

Patent Literature

PTL 1: US 2006/0134936 A1

SUMMARY OF INVENTION

Technical Problem

However, there is a possibility with the prior storage apparatus that a load on each switch unit may change during data transfer, depending on to which port of the switch unit an interface unit for a host system or a storage device is connected. If a load on each switch unit changes depending on the connection configuration of the interface units, each switch unit for the prior storage apparatus cannot function sufficiently, and degration of data transfer tends to easily occur when the switches perform data transfer between duplicated controllers for the purpose of mirroring; and there is a possibility that the data transfer efficiency of the entire apparatus may degrade.

The present invention was devised in light of the circumstances described above and suggests a storage apparatus capable of restraining degration of data transfer performance during data transfer for mirroring between duplicated controllers, and also suggests an interface expansion authentication method for such a storage apparatus.

Solution to Problem

In order to solve the above-described problem, a storage apparatus having first and second controllers for controlling data transfer between a host system and a storage device, the first and second controllers respectively comprising: a first and second switch units, each of which is equipped with a first port for connecting each interface unit for the host system and an interface unit for the storage device, and a second port for connecting the first controller with the second controller, and which permits or prohibits data transfer using each of the first port and the second port; and a processor for controlling data transfer with the host system or the storage device via the first port, while controlling data transfer between the first controller and the second controller via the second port, by controlling the first or second switch unit; wherein the first and second controllers are connected to each other via: a first path for connecting the second port of the first switch unit in the first controller to the second port of the first switch unit in the second controller; and a second path independent of the first path, for connecting the second port of the second switch unit in the first controller to the second port of the second switch unit in the second controller.

Also, an interface expansion authentication method for a storage apparatus having first and second controllers for controlling data transfer between a host system and a storage device, the interface expansion authentication method comprising: an acquisition step executed by each processor of the first and second controllers, for obtaining the current connection configuration of an interface unit connected to each first port of first and second switch units where the first port for connecting each interface unit of the host system and the storage device; a generation step executed by the processor, for generating system configuration information about the connection configuration of the interface units for all the first ports of the first and second controllers based on the configuration information about both the first and second controllers; a verification step executed by the processor, for verifying the current connection configuration by comparing system configuration rules about the specified connection configuration of the interface unit to be connected to each first port of the first or second switch unit with the system configuration information; and a control step executed by the processor, for permitting or prohibiting data transfer using each first port of the first or second switch unit based on the verification result in the verification step.

Advantageous Effects of Invention

According to this invention, a load is equally distributed to each controller according to the connection configuration of an interface unit to a first port of a switch unit in each controller and to prevent degradation of data transfer performance during data transfer between the controllers.

BRIEF DESCRIPTION OF DRAWINGS

FIG. 12A shows an example of three types of system configuration rules.

FIG. 12B shows an example of three types of system configuration rules.

FIG. 12C shows an example of three types of system configuration rules.

FIG. 13 shows an example of a management screen displayed on a display unit for a management apparatus.

REFERENCE SIGNS LIST

Figure 1:
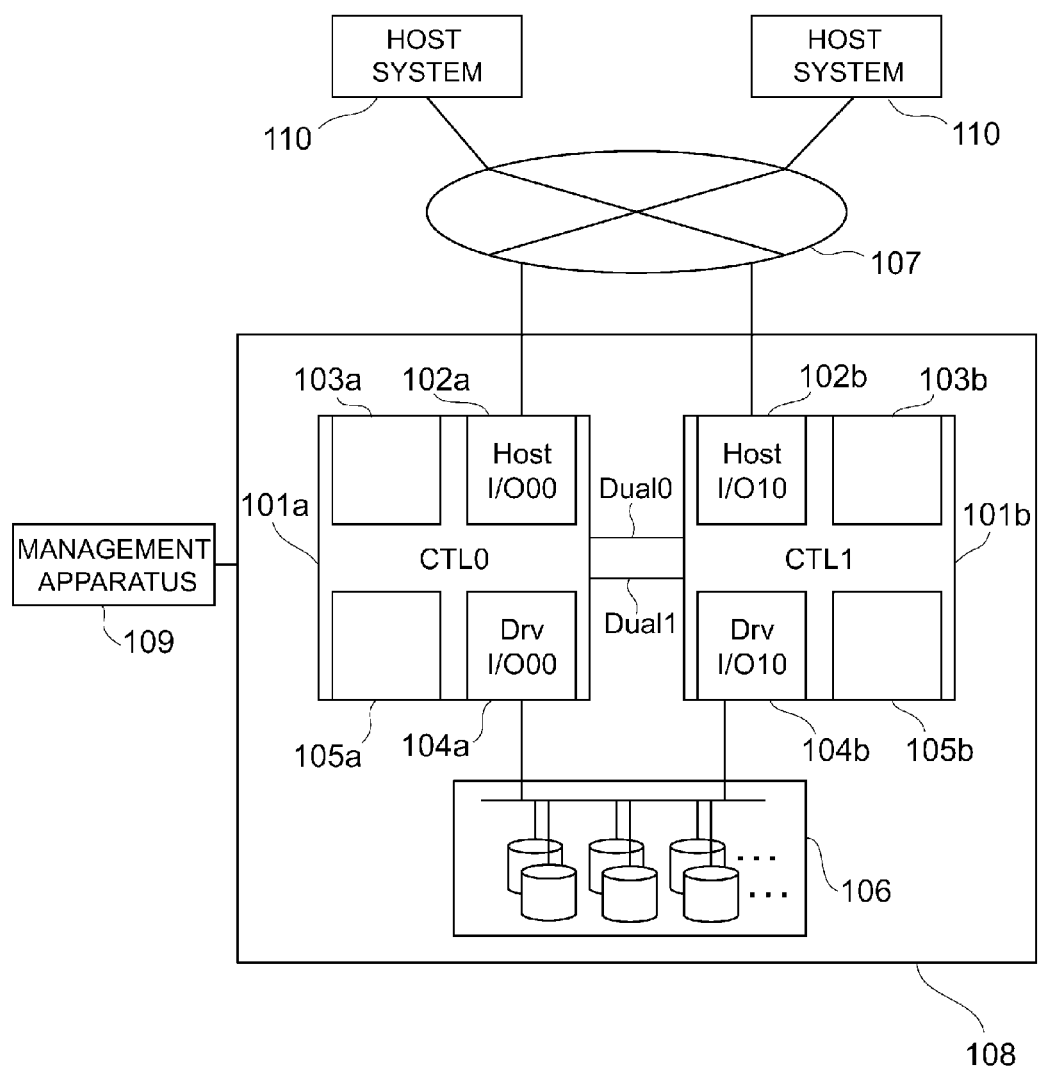
FIG. 1 is a schematic configuration diagram of a computer system according to an embodiment of the present invention.

101a First controller
101b Second controller
102a, 102b, 104a, 104b, 313a, 313b, 411a, 411b I/O modules
413a, 413b, 504a, 504b, 511a, 511b, 513a, 513b I/O modules
110 Host system
107 Network
108 Storage apparatus
109 Management apparatus
201a Local memory
201b Local memory
202a Cache
202b Cache
204a Processor
204b Processor
205a First switch unit
205b First switch unit
206a Second switch unit
206b Second switch unit
950 Management screen
Dual0, Dual1 Inter-controller connection path
P00 to P13 I/O ports

DESCRIPTION OF EMBODIMENTS

An embodiment of the present invention will be described below in detail with reference to the attached drawings.

(1) Configuration of Computer System According to this Embodiment

FIG. 1 shows the general configuration of a computer system according to this embodiment. This computer system includes a host system 110, a network 107, a storage apparatus 108, and a management apparatus 109. The host system 110 and the storage apparatus 108 are connected to the network 107. The host system 110 is a host computer and transfers data to and from the storage apparatus 108 via the network 107.

The storage apparatus 108 transfers data to and from the host system 110, stores data from the host system 110, and reads data stored in a storage device 106 and transfers the read data. The storage apparatus 108 schematically includes a first controller 101a, a second controller 101b, and a storage device 106. The storage apparatus 108 is configured to have duplicated controllers that have almost the same configuration. These first and second controllers 101a, 101b are connected together via inter-controller connection paths Dual0, Dual1 that are first and second paths.

Each of the first controller 101a and the second controller 101b is provided with at least one I/O port as a first port. The first controller 101a is provided with I/O ports 102a, 103a, 104a, 105a, while the second controller 101b is provided with I/O ports 102b, 103b, 104b, 105b.

In this embodiment, a host I/O module that is an interface unit for the host system 110, or a drive I/O module that is an interface unit for the storage device 106 is connected to each of the I/O ports 102a, 104a, 102b, 104b. The host or drive I/O module(s) will be hereinafter generally referred to as the "I/O module(s)." Also, the host system may be sometimes generally referred to as the "host," and the storage device as the "drive."

The I/O ports 103a, 105a, 103b, 105b of the first controller 101a and the second controller 101b to which no I/O module is connected are unused ports to which an I/O module can be added. The I/O modules 102a, 102b are interface units for transferring information by packets to and from the host system 110 via the network 107 according to a specified communication protocol.

The network 107 is a network mainly used to transfer data between the host system 110 and the storage apparatus 108. A network such as a LAN (Local Area Network) or a SAN (Storage Area Network) is adopted as the network 107, which is configured to include, for example, a network switch or a hub.

The host system 110 is, for example, a computer or a file server that serves as the core part of a business system. The host system 110 is equipped with hardware resources such as a processor, memory, network interface, and local input/output devices. The host system 110 is equipped with software resources such as device drivers, an operating system (OS), and application programs. Accordingly, the host system 110 communicates with, and transfers data to and from, the storage apparatus 108 by executing various programs under the control of the processor.

The I/O modules 104a, 104b are I/O modules that control transfer of information to and from the storage device 106 by blocks, which are access units for the storage devices, according to a specified communication protocol.

The storage device 106 includes a plurality of drives such as hard disk drives (HDD: Hard Disc Drives). The storage device 106 may be an SSD (Solid State Drive) on which a plurality of nonvolatile memories are mounted as storage media. The storage device 106 is configured so that a large number of such drives or storage media are mounted in an array.

The expansion I/O ports 103a, 105a, 103b, 105b are slots according to a bus standard such as PCI-Express. I/O modules to be connected to these expansion I/O ports are also configured according to the bus standard.

The management apparatus 109 is equipped with: hardware resources such as a processor, a memory, a network interface, a display unit, and local input/output devices; and software resources such as management programs. The management apparatus 109 is connected to each of the controllers 101a, 101b in the storage apparatus 108. Incidentally, the management apparatus 109 may be configured so that it is connected via the network 107 to each controller 101a, 101b.

The management apparatus 109 periodically obtains information from the storage apparatus 108 and displays it on a management screen described later (for example, a screen shown in FIG. 13). The management apparatus 109 has a function transferring information necessary for operation of the storage apparatus 108 to the storage apparatus 108 in accordance with operation by a system administrator by referring to the management screen. The system administrator can monitor and control the storage apparatus 108 as necessary for the operation purpose by operating it while watching the management screen displayed on the management apparatus 109.

Figure 2:
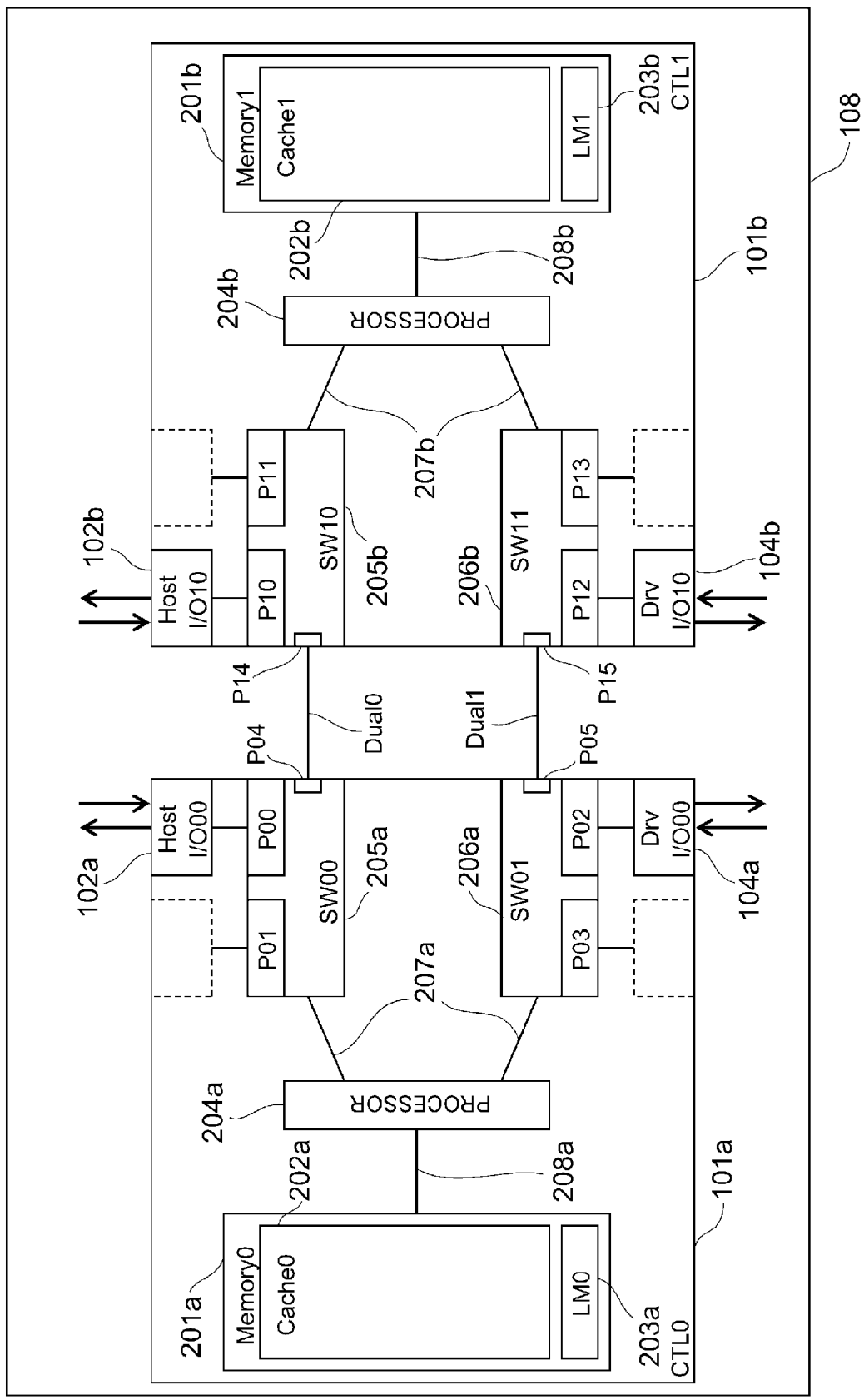
FIG. 2 is a configuration diagram of a storage apparatus according to the embodiment.

FIG. 2 is a block diagram showing the internal configuration of the storage apparatus 108 according to this embodiment. The storage apparatus 108 includes two dualized controllers 101a, 101b. These first and second controllers 101a, 101b are connected to each other via the inter-controller connection paths Dual0, Dual1 which are independent of each other.

The first controller 101a (CTL0) is equipped with the processor 204a, a memory 201a, a first switch unit 205a, and a second switch unit 206a. On the other hand, the second controller 101b (CTL1) is equipped with the processor 204b, a memory 201b, a first switch unit 205b, and a second switch unit 206b.

Each processor 204a, 204b includes a memory controller and communicates with the memory 201a, 201b via memory buses 208a, 208b. Each processor 204a, 204b has a plurality of I/O ports. A bus standard such as PCI-Express is adopted for such I/O ports, and any device having an interface that meets the bus standard.

The first switch unit 205a and the second switch unit 206a are connected respectively to the plurality of I/O ports of the processor 204a. The first switch unit 205b and the second switch unit 206b are connected respectively to the plurality of I/O ports of the processor 204b.

An area for the memory 201a is divided into a cache 202a and a local memory 203a. An area for the memory 201b is divided into a cache 202b (Cache1) and a local memory 203b (LM1). Each cache 202a, 202b is an area for storing data transferred from each I/O module. Each local memory 203a, 203b is an area for storing control information about each processor 204a, 204b.

The memory 201a is connected via the memory bus 208a to the processor 204a. The memory 201a is used to transfer data to and from a local cache in a CPU for the processor 204a via an I/O port of the processor 204a. On the other hand, the memory 201b is connected via the memory bus 208b to the processor 204b. The memory 201b is used to transfer data to and from a local cache in a CPU for the processor 204b via an I/O port of the processor 204b.

The first switch unit 205a and the second switch unit 206a having a plurality of I/O port for one processor 204a are mounted on the first controller 101a, the configuration of the first controller 101a is suited for I/O module expansion. On the other hand, the first switch unit 205b and the second switch unit 206b having a plurality of I/O ports for one processor 204b are mounted on the second controller 101b, the configuration of the second controller 101b is suited for I/O module expansion.

In the first controller 101a, the first switch unit 205a has I/O ports P00, P01 as a plurality of I/O ports. The second switch unit 206a has I/O ports P02, P03 as a plurality of I/O ports. In the second controller 101b, the first switch unit 205b has I/O ports P10, P11 as a plurality of the I/O ports. The second switch unit 206b has I/O ports P12, P13 as a plurality of the I/O ports.

In the example shown in FIG. 2, the host I/O modules 102a, 102b are connected to the I/O ports P00, P10 respectively, and the drive I/O modules 104a, 104b are respectively connected to the I/O expansion ports P02, P12. On the other hand, there are the expansion I/O ports P01, P03, P11, P13 to which no I/O module is connected; and at the time of I/O expansion, expansion I/O modules are connected to these expansion I/O ports P01, P03, P11, P13. Incidentally, these I/O ports such as P00 correspond to the first ports.

Each of the first and second switch units 205a, 206a is respectively connected to the processor 204a. The first and second switch units 205a, 206a have a function permitting or prohibiting data transfer by using each port under the control of the processor 204a. Each of the first switch unit 205a and the second switch unit 206a has a multicast function. The first and second switch units 205a, 206a generate packets of data to be transferred based on a specified transfer destination address and transfers them to the transfer destination (such as the memory 201a). Meanwhile, because of the multicast function, the first and second switch units 205a, 206a can duplicate the data in the packet form and transfer them to other desirable transfer destinations.

The I/O modules connected to the I/O ports of the first and second switch units 205a, 206a transfer data to and from the memory 201a via the processor 204a. On the other hand, the first and second switch units 205b, 206b are respectively connected to the processor 204b. The I/O modules connected to the first and second switch units 205b, 206b transfer data to and from the memory 201b via the processor 204b.

The first and second switch units 205b, 206b are provided with not only the I/O ports, such as P00, serving as the interface units for the host system 110 and the storage device 106, but also ports P04, P05. The ports P04, P05 are used for paths connecting the first controller 101a and the second controller 101b. The first and second switch units 205b, 206b permit and prohibit data transfer by using any of the I/O ports such as P00 and the ports such as P04 under the control of the processor 204a.

The inter-controller connection path Dual0 connects the port P04 of the first switch unit 205a for the first controller 101a with the port P14 of the first switch unit 205b for the second controller 101b. On the other hand, the inter-controller connection path Dual1 is a path independent of the inter-controller connection path Dual0 and connects the port P05 of the second switch unit 206a for the first controller 101a with the port P15 of the second switch unit 206b for the second controller 101b. Incidentally, these ports P04, P05, P14, P15 correspond to the second ports.

Each switch unit 205a, 206a, 205b, 206b has the multicast function. This multicast function duplicates a packet transferred from the host system 110 via the I/O module in the switch, replaces the address of the relevant duplicated packet, controls the transfer destination in its controller which has received the packet, and also controls transfer of the packet to a transfer destination in the other controller. Incidentally, the multicast function is standardized by, for example, PCI SIG.

In the storage apparatus 108 which uses the configuration with the duplicated controllers as described above, data transferred from the host system 110 is stored in the caches 202a, 202b which the controllers 101a, 101b have respectively, in order to prevent loss of the data transferred from the host system 110 due to a failure of the controller(s). The storage apparatus 108 performs synchronous transfer of data to the caches 202a, 202b for both the controllers 101a, 101b by using the multicast function of, for example, the first switch unit 205a, thereby performing a so-called double data write action.

The storage apparatus 108 which uses the above-described configuration can change the I/O module configuration of the entire storage apparatus by selecting the type of an I/O module to be connected to each expansion I/O port (such as P01). According to this embodiment, the content about the connection configuration of an I/O module for each I/O port of each controller 101a, 101b is referred to as the "configuration information"; and the connection configuration about I/O modules of the entire storage apparatus is defined as the "system configuration"; and the content about the system configuration is referred to as the "system configuration information." Incidentally, in this embodiment, the term "system configuration rules" is used to mean rules for specifying the desirable connection configuration of the I/O modules for the I/O ports. Incidentally, the system configuration rules can be set arbitrarily by the system administrator using the management apparatus 109.

In the storage apparatus 108, the load status of the inter-controller connection paths Dual0, Dual1, through which transfer via a plurality of I/O modules is multiplexed, and each processor-to-switch-unit buses 207a, 207b varies depending on differences of the system configuration. Data transfer by the storage apparatus 108 can be divided into an action to transfer data from the host system 110 to the storage device 106 (write action) and an action to transfer data read from the storage device 106 to the host system 110 (read action).

When the storage apparatus 108 performs the write action or the read action, the load status of each of the inter-controller connection paths Dual0, Dual1 and the processor-to-switch-unit buses 207a, 207b varies depending on the arrangement of different types of I/O modules (host I/O modules and drive I/O modules) connected to each switch (such as 205a).

(2) System Configuration Rules

Next, verification of the connection configuration of the I/O modules for the I/O ports by using the system configuration rules will be explained. Three types of system configuration rules will be explained below as an example, by using the configuration of the storage apparatus 180 shown in FIG. 2 as the initial configuration.

(2-1) First System Configuration Rule

In the first controller 101a, different types of I/O modules are connected to a plurality of I/O ports of at least one of the first switch unit 205a and the second switch unit 205b. The expression "different types of I/O modules" used herein means I/O modules which are, for example, both the host I/O modules and the drive I/O modules. On the other hand, the expression "the same type of I/O modules" means I/O modules which are, for example, either the host I/O modules or the drive I/O modules.

Figure 3:
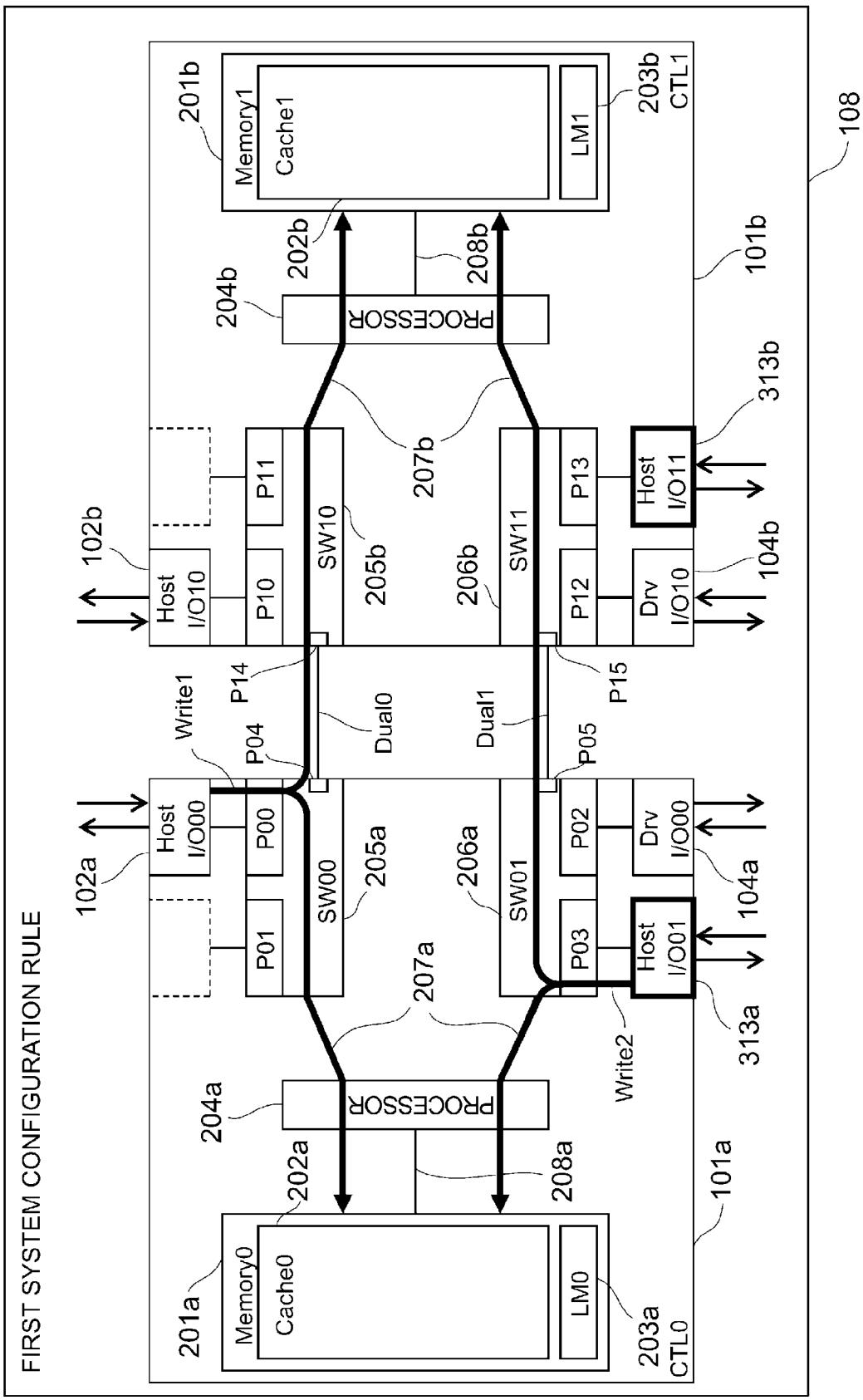
FIG. 3 is a block diagram explaining the first system configuration rule.

FIG. 3 is a block diagram showing an example of the configuration in which I/O modules are added according to the first system configuration rule. FIG. 3 shows an example where the connection configuration of the I/O modules shown in FIG. 2 is set as the initial configuration, and a host I/O module is added to the controllers 101a, 101b respectively according to the first system configuration rule.

In the first controller 101a, an I/O host 313a is newly added to the I/O port P03 of the second switch unit 206a in the state where the drive I/O module 104a is connected to the I/O port P02 of the second switch unit 206a.

On the other hand, in the second controller 101b, different types of I/O modules are connected to a plurality of I/O ports of at least one of the first switch unit 205b and the second switch unit 206b. Specifically speaking, in the second controller 101b, a host I/O module 313b is newly added to the I/O port P13 of the second switch unit 206b in the state where the drive I/O module 104b is connected to the I/O port P12 of the second switch unit 206b.

In other words, if the configuration of the storage apparatus 108 shown in FIG. 2 is set as the initial configuration as described above and host I/O modules are to be added, the host I/O module 313a, 313b are respectively connected to the expansion ports P03, P13 of the second switch units 206a, 206b, as shown in FIG. 3. On the other hand, when adding drive I/O modules, drive I/O modules (not shown in the drawing) are respectively connected to the expansion ports P01, P11 of the first switch unit 205a, 205b. Because of the above-described connection configuration of the I/O modules, the storage apparatus 108 transfers data as described below. The case of a write action will be explained as an example of the data transfer.

FIG. 3 shows the case where a write action Write1 that is transfer of data from the host I/O module 102a (Host I/O 00) for the first controller 101a, as an example of data transfer from the host system 110, and a write action Write2 that is transfer of data from the added host I/O module 313a (Host I/O 01) for the second switch unit 206a, as an example of data transfer from the host system 101, occur at the same time.

Packets produced by the write action Write1 via the host I/O module 102a (Host I/O 00) are transferred through the first switch unit 205a and the processor 204a to the cache 202a. When this happens, the first switch unit 205a uses the multicast function to duplicate the data on a packet basis and then change the transfer destination of the relevant packet to a transfer destination address in the second controller 101b. As a result, the first switch unit 205a performs synchronous transfer of the data through the inter-controller connection path Dual0, through the first switch unit 205b, and through the processor 204b on the second controller 101b, to the second cache 202b. That is, the same content packets are doubly stored in the caches 202a, 202b for both the controllers 101a, 101b.

On the other hand, packets produced by the write action Write2 via the host I/O module 313a (Host I/O 03) are transferred through the second switch unit 206a and the processor 204a, to the first cache 202a in almost the same manner as described above. The second switch unit 206a uses the multicast function to perform synchronous transfer of the data through the inter-controller connection path Dual1 and then through the second switch unit 206b and the processor 204b for the second controller 101b, to the cache 202b in almost the same manner as described above. That is, the same content packets are doubly stored in the caches 202a, 202b in the controllers 101a, 101b.

The above-described configuration where data transferred via each host I/O module is duplicated and stored in the caches 202a, 202b uses the inter-controller connection paths Dual0, Dual1 and each processor-to-switch buses 207a, 207b as separate transfer paths.

If the first system configuration rule described above is applied to the storage apparatus 108, a processing load imposed by the write action Write1 from each host I/O module is distributed to the first controller 101a and the second controller 101b. Specifically, the processing load imposed by the write action Write1 is distributed to the plurality of the processor-to-switch buses 207a, 207b. As a result, the load imposed on the storage apparatus 108 in the system status where the write action is continuously performed, is equally divided to both the controllers 101a, 101b, and throughput of the entire system for writing data from the host system 110 to the corresponding caches can be enhanced.

In the storage apparatus 108, the first controller 101a and the second controller 101b are connected to each other via the inter-controller connection paths Dual0, Dual1 which are independent of each other as described above. Accordingly, when the processor 204a for the storage apparatus 108 transfers data between the first controller 101a and the second controller 101b for the purpose of mirroring, a data transfer competition can be reduced due to the two paths Dual0, Dual1, so that data can be transferred smoothly.

The storage apparatus 108 is configured so that I/O modules for both the host system 110 and the storage device 106 are connected to the plurality of I/O ports of at least one of the first switch unit 205a and the second switch unit 205a. As a result, even if the amount of data transferred between the processor 204a and the first switch units 205a, 205b increases as described above, it is possible to prevent the data transfer processing from influencing the second switch units 206a, 206b. Also, even if the amount of data transferred between the processor 204a and the second switch units 206a, 206b increases, it is possible to prevent the data transfer processing from influencing the first switch units 205a, 205b. In short, a load is not disproportionately imposed on the controllers 101a, 101b depending on the positions of the I/O ports to which the I/O modules are connected, but the load is distributed to each controller.

(2-2) Second System Configuration Rule

Next, the second system configuration rule will be explained below. The second system configuration, like the first system configuration rule described above, is based on the initial configuration of the storage apparatus 108 shown in FIG. 2. When adding a host I/O module according to the second system configuration rule, only the same type of I/O modules are added to each switch unit. Specifically speaking, I/O modules for only the host system 110 or the storage device 106 are connected to a plurality of I/O ports of the first switch unit 205a or the second switch unit 206a.

Figure 4:
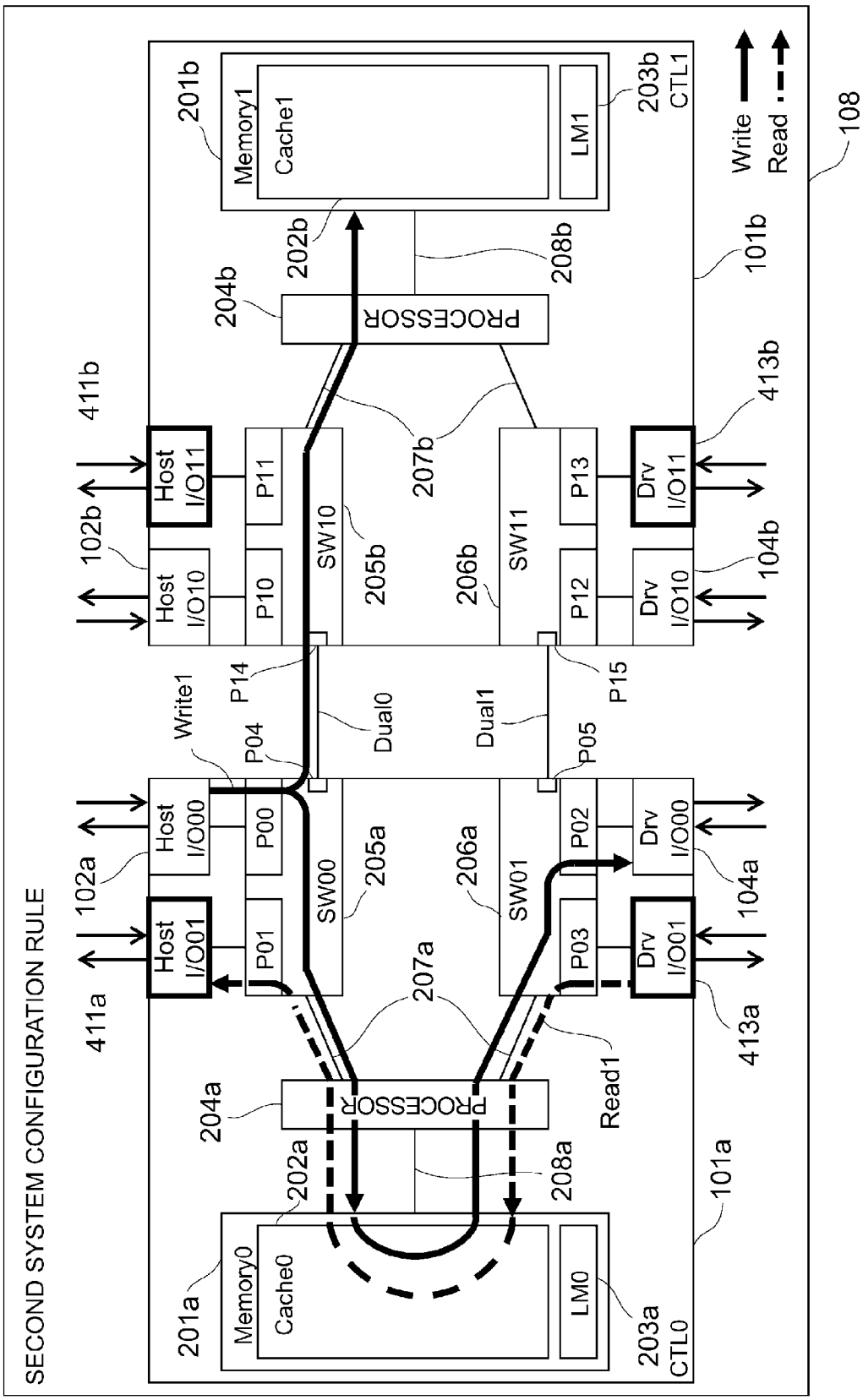
FIG. 4 is a block diagram explaining the second system configuration rule.

FIG. 4 is a block diagram showing an example of the configuration in which I/O modules are added according to the second system configuration rule. FIG. 4 shows an example in which host I/O modules and drive I/O modules are added to each controller 101a, 101b according to the second system configuration rule based on the connection configuration of the I/O modules as shown in FIG. 2 as the initial configuration.

A host I/O module 411a is added to the I/O port P01 of the first switch unit 205a for the first controller 101a. A host I/O module 411b is added to the I/O port P11 of the first switch unit 205b for the second controller 101b. Meanwhile, a drive I/O module 413a is added the I/O port P03 of the second switch unit 206a for the first controller 101a. A drive I/O module 413b is added to the I/O port P13 of the second switch unit 206b for the second controller 101b.

Next, the write action and the read action will be explained as an example of data transfer from the host system 110. FIG. 4 shows how data is transferred from the host I/O module 102a via the cache 202a to the drive I/O module 104a (write action Write1). FIG. 4 also shows how data is transferred the drive I/O module 413a via the cache 202a to the host I/O module 411a (read action Read1). In FIG. 4, the read action Read1 and the write action Write1 are executed at the same time.

Packets produced by the write action Write1 via the host I/O module 102a are transferred via the first switch unit 205a and the processor 204a to the cache 202a. When this happens, the first switch unit 205a uses the multicast function to duplicate the transferred data on a packet basis and change the transfer destination of the data duplicated on a packet basis to a transfer destination address in the second controller 101b. The first switch unit 205a synchronously transfers the data duplicated on a packet basis via the first switch unit 205b and the processor 204b to the cache 202b in the second controller 101b.

Specifically speaking, the packet-based data is duplicated and transferred to the caches 202a, 202b for the first controller 101a and the second controller 101b. The packets produced by the write action Write1 and stored in the cache 202a are transferred from the cache 202a via the processor 204a and the second switch unit 206a to the drive I/O module 104a, and then stored in the aforementioned storage device 106.

Next, the read action Read1 will be explained. The read action Read1 is executed at the same time as the write action Write1 as described above. Data read from the storage device 106 is transferred via the drive I/O module 413a, the second switch unit 206a, and the processor 204a, and then to the cache 202a. The data stored in the cache 202a is transferred via the processor 204a, the first switch unit 205a, and the host I/O module 411a, and then to the host system 110.

At any time during the data transfer from the host system 110 and the data transfer to the host system 110, no single-direction data transfer is performed in each processor-to-switch bus 207a. Because data is not transferred only in one direction at the same time in the processor-to-switch buses 207a, transfer performance in the write action or read action is equal to transfer performance of the processor-to-switch buses 207a write action read action.

In the storage apparatus 108, I/O modules for only the host system 110 or the storage device 106 are connected to a plurality of I/O ports (such as P01) of the first switch unit 205a or the second switch unit 206a as described above. Because such connection configuration makes an image of performance guarantee between the write action and the read action by the host system 110 and sequential write actions and read actions do not compete against each other, it is possible to obtain performance to execute the read action during the write action.

(2-3) Third System Configuration Rule

Next, the third system configuration rule will be explained. The third system configuration rule is similar to the second system configuration rule described above because only the same type of I/O modules are connected to each switch unit 205a, 206a, 205b, 206b for each controller 101a, 101b. However, there is a difference between the third system configuration rule and the second system configuration rule as described below.

The third system configuration rule is characterized in that the type of I/O modules, which are connected to each of the switch units 205a etc., on the first and second controllers 101a, 101b, is same on a diagonal line.

Figure 5:
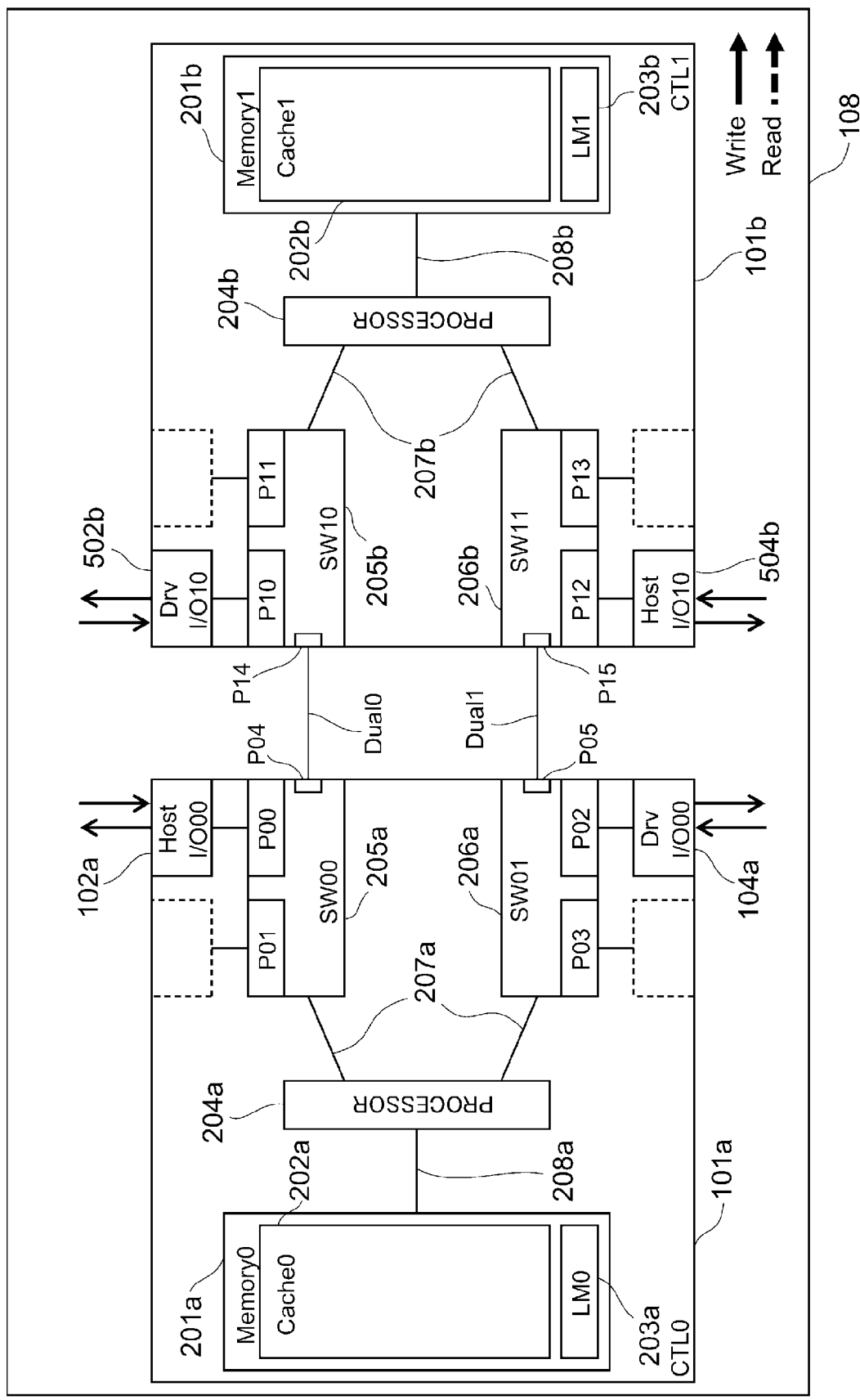
FIG. 5 is a block diagram explaining the third system configuration rule.

FIG. 5 is a block diagram showing an example of the configuration to which the third system configuration rule is applied. The configuration shown in the drawing represents the initial configuration before any I/O module is added. Regarding the first controller 101a in this state, the I/O port P01 of the first switch unit 205a and the I/O port P03 of the second switch unit 206a are unused ports to which I/O modules can be added. On the other hand, regarding the second controller 101b, the I/O port P11 of the first switch unit 205b and the I/O port P13 of the second switch unit 206b are unused ports to which I/O modules can be added.

Figure 6:
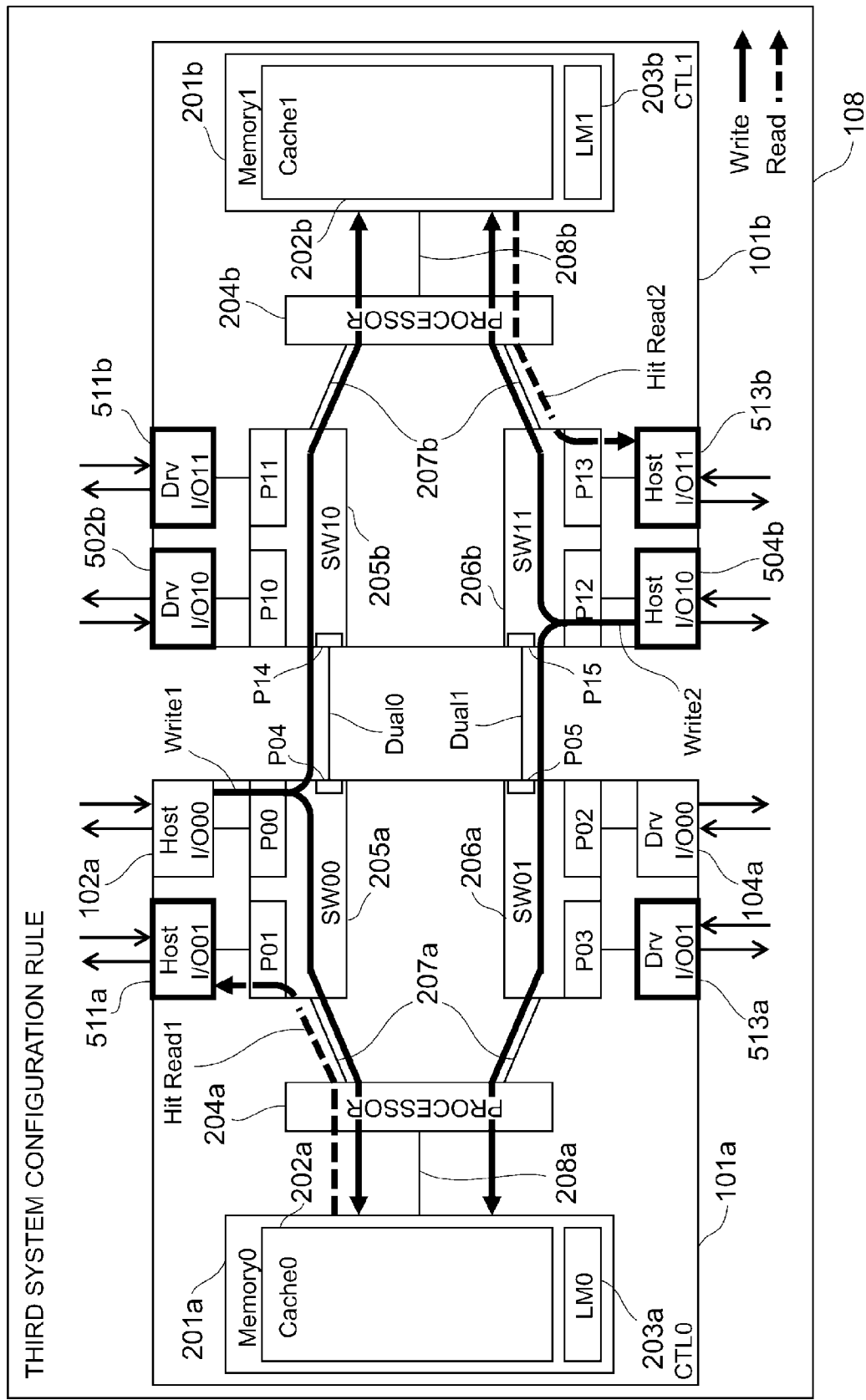
FIG. 6 is a block diagram explaining the third system configuration rule.

FIG. 6 is a block diagram showing an example of the configuration where I/O modules are added according to the third system configuration rule. The configuration shown in the drawing represents the configuration where host I/O modules 511a, 511b and drive I/O modules 513a, 513b are respectively added to the first controller 101a and the second controller 101b.

Regarding the first controller 101a, the I/O modules 102a, 511a for only the host system 110 are respectively connected to the I/O ports P00, P01 of the first switch unit 205a, and the I/O modules 104a, 513a for only the storage device 106 are respectively connected to the I/O ports P02, P03 of the second switch unit 206a. On the other hand, regarding the second controller 101b, the I/O modules 502b, 511b for only the storage device 106 are respectively connected to the I/O ports P10, P11 of the first switch unit 205b, and the I/O modules 504b, 513b for only the host system 110 are respectively connected to the I/O ports P12, P13 of the second switch unit 206b.

In other words, when adding host I/O modules to the initial configuration shown in FIG. 5, the host I/O module 511a is connected to the expansion port P01 of the first switch unit 205a for the first controller 101a and the host I/O module 513b is connected to the expansion port P13 of the second switch unit 206b for the second controller 101b as shown in FIG. 6.

On the other hand, when adding drive I/O modules to the initial configuration shown in FIG. 5, the drive I/O module 513a is connected to the expansion port P03 of the second switch unit 206a for the first controller 101a and the drive I/O module 511b is connected to the expansion port P11 of the first switch unit 205b for the second controller 101b as shown in FIG. 6.

Next, write actions and actions to transfer data to the host system 110 by means of cache read in the configuration shown in FIG. 6 will be explained. An example in the drawing shows the case where write actions Write1, Write2 via host I/O modules 102a, 504b and data transfer Hit Read1, Hit Read2 by means of cache read via host I/O modules 511a, 513b occur at the same time.

Data produced by the write action Write1 via the host I/O module 102a is transferred via the first switch unit 205a and the processor 204a to the cache 202a in the first controller 101a. The first switch unit 205a uses the multicast function to duplicate the data to be transferred on a packet basis and change the transfer destination of the packet-based data to a transfer destination address in the second controller 101b. As a result, the first switch unit 205a synchronously transfers the data via the inter-controller connection path Dual0, the first switch unit 205b and the processor 204b, and then to the cache 202b. When data produced by the write action Write2 from the host I/O module 504b is also transferred via the second switch unit 206b and the processor 204b to the cache 202b in the same manner as described above, the data is synchronously transferred via the inter-controller connection path Dual1 to the cache 202a for the first controller 101a by means of the multicast function.

Concurrently with the write actions Write1 etc., data relating to the read action Hit Read1 via the host I/O module 511a is transferred from the cache 202a via the processor 204a, the first switch unit 205a, and the host I/O module 511a, and then to the host system 110. Similarly, data relating to the read action HitRead2 via the host I/O module 513b is transferred from the cache 202b via the processor 204b, the second switch unit 206b, and the host I/O module 513b, and then to the host system 110.

If the third system configuration rule is applied as described above, the first controller 101a and the second controller 101b are configured that the I/O modules only for the host system 110 are connected to the plurality of I/O ports of the first switch unit 205a or 205b. On the other hand, the I/O modules only for the storage device 106 are connected to the plurality of I/O ports of the second switch unit 206a or 206b. Alternatively, the first controller 101a and the second controller 101b are configured that the I/O modules only for the storage device 106 are connected to the plurality of I/O ports of the first switch unit 205a or 205b. On the other hand, the I/O modules only for the host system 110 are connected to the plurality of I/O ports of the second switch unit 206a, 206b.

If the third system configuration rule is applied as described above, the data transfer from the host system 110 and the data transfer to the host system 110 are not performed in the same direction in each processor-to-switch bus 207a. Furthermore, in the processor-to-switch buses 207a and the inter-controller connection paths Dual0, Dual1, the amount of data flow caused by the write actions by the host I/O modules is respectively equal to the amount of data flow caused by the write action performed in one controller. In other words, a load imposed by the data transfer caused by the write actions in the first controller 101a and the second controller 101b is efficiently distributed to each controller. As a result, the first controller 101a and the second controller 101b can distribute the load imposed by the data transfer to both the controllers without avoiding disproportionately imposing the load to only one controller, so that the storage apparatus 108 can transfer data very efficiently as a whole.

(3) Management of Configuration Information and System Configuration Information When adding I/O modules according to the system configuration rules, it is desirable that the current system configuration should be recognized when changing the system configuration by adding/reducing the I/O modules to/from the storage apparatus 108. The storage apparatus 108 verifies whether the system configuration is appropriate for the write action or the read action by comparing the current system configuration with each system configuration rule. Furthermore, the storage apparatus 108 displays the verification result on the management apparatus 109, thereby presenting it visually to the administrator and showing whether the current system configuration is the desirable system configuration or not. Incidentally, the system configuration is related to not only the number and types of the I/O modules to be added, but also the positions of the I/O ports in each switch unit.

Configuration Information Update

Figure 7:
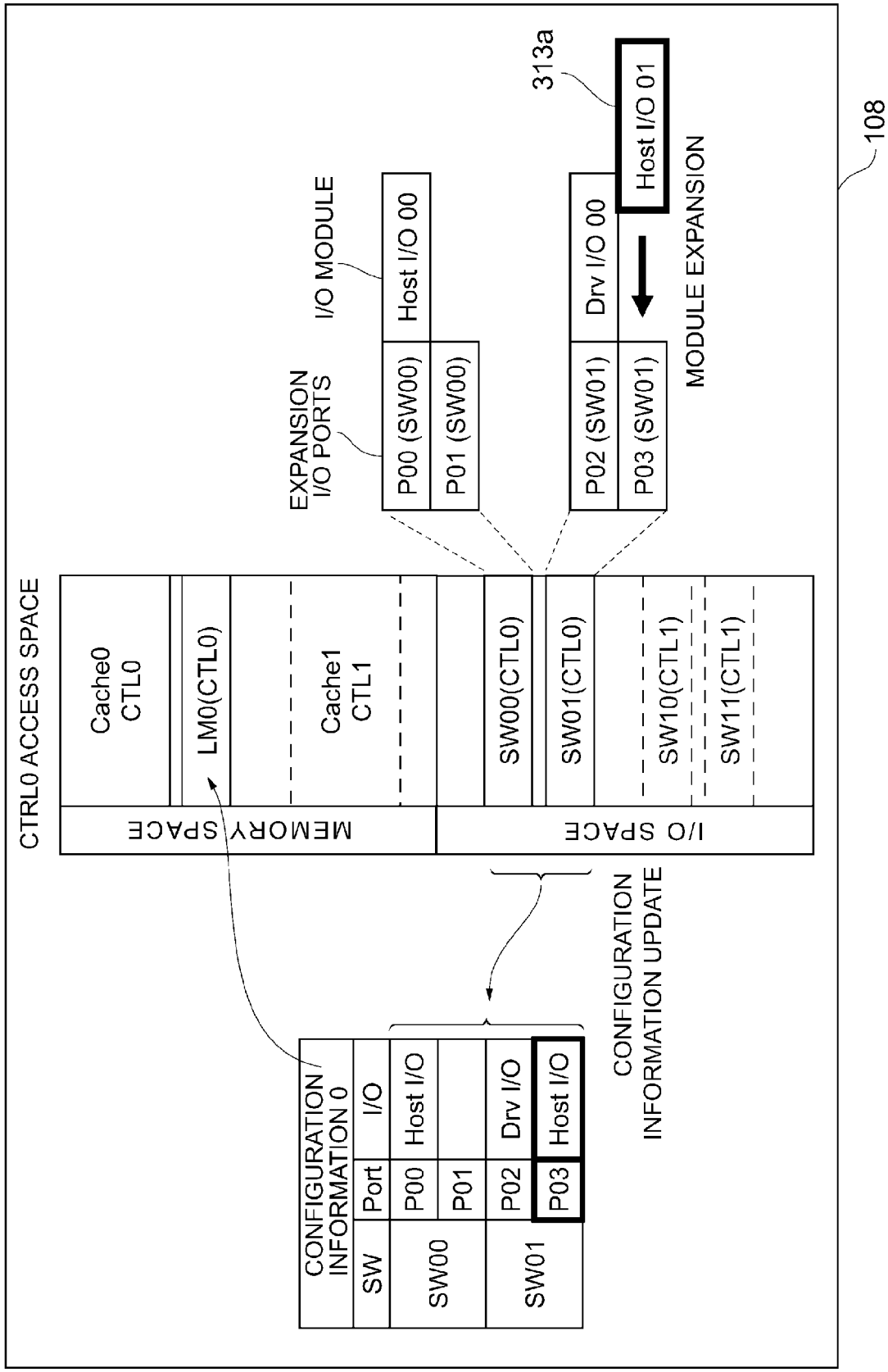
FIG. 7 is an explanatory diagram of resource allocation when an I/O module is added.

FIG. 7 is a memory map showing an example of an access space accessed by the processor 204a for the first controller 101a. Incidentally, the first controller 101a will be mainly explained below, but almost the same explanation can be given about the second controller 101b.

When the processor 204a transfers data to, or writes or reads control information to or from, components such as the memory 201a and the switch unit 205a, and the I/O modules connected to such components, the processor 204a accesses the above-mentioned access space. When the processor 204a initializes the controller, for example, at the time of power-on or system reset, it secures an access space for accessing each of all the I/O ports P00, P01, P02, P03 of the switches 205a, 206a and also secures an access space for the memories such as 201a.

The access space shown in FIG. 7 includes a memory access space (which corresponds to a Memory Space in the drawing) for, for example, the cache 202a and an access space (which corresponds to an I/O Space in the drawing) for each device mounted on the controller. The I/O space is partitioned for each of the first and second controllers 101a (CTL0), 101b (CTL1) and for each switch unit 205a, etc. into spaces for accessing each I/O port. The processor 204a accesses each of the partitioned spaces in order to access the I/O module connected to each I/O port.

Referring to FIG. 7, particularly the spaces secured for the switch unit 205a (SW00), 206a (SW01) are further divided into smaller spaces for each I/O port. Each space corresponding to each I/O port is assigned to the relevant I/O module connected to each port and is used as the access space for each of the devices such as host and drive I/O modules for transferring data to and from the host system 110 or the storage device 106.

Regarding the first controller 101a, not only cache memory spaces for, for example, the cache 202b for the second controller 101b are secured in the above-described memory space, but also I/O spaces for the first switch unit 205b (SW10) and the second switch unit 206b (SW11) are secured in the above-described I/O space so that the processor 204a can also access the cache 202b and the I/O modules for the second controller 101b.

Next, the access spaces secured mainly for the switch units in the I/O space shown in FIG. 7 will be explained below in detail. The access spaces for the switch units are necessary when the processor 204a transfers data by controlling the first switch unit 205a and the second switch unit 205a for the first controller 101a and transfers control information. Moreover, the access space for each switch unit includes access spaces for the I/O ports P00, P01 of the first switch unit 205a and access spaces for the I/O ports P02, P03 of the second switch unit 206a.

Furthermore, for example, the access space for the I/O port P00 is used by the processor 204a when accessing the I/O module (the host I/O module 104a) connected to that I/O port P0. A control space for the host I/O module 104a is mapped in the access space for the I/O port P00. The control space herein used means a so-called control register map.

Meanwhile, the access space to be accessed by the processor 204a is also secured for the I/O port P01 in the same manner. If an I/O module is not connected to the I/O port P01, the processor 204a recognizes that no access device is assigned to that space, and thereby does not access the space. Incidentally, almost the same explanation can be given about the I/O ports P02, P03.

As described above, the access space for each I/O port is secured irrespective of whether the access space is actually connected to an I/O module or not. When adding and connecting an I/O module to the I/O port, the processor 204a identifies the expansion I/O port and controls access to the access space corresponding to that I/O port.

Management of Connection Status

Next, detection of the I/O module, identification of the I/O port to which the I/O module is added, and management of the I/O module connection status regarding each I/O port in the controller, which are executed by the processor 204a when adding an I/0 module, are explained below.

Figure 8:
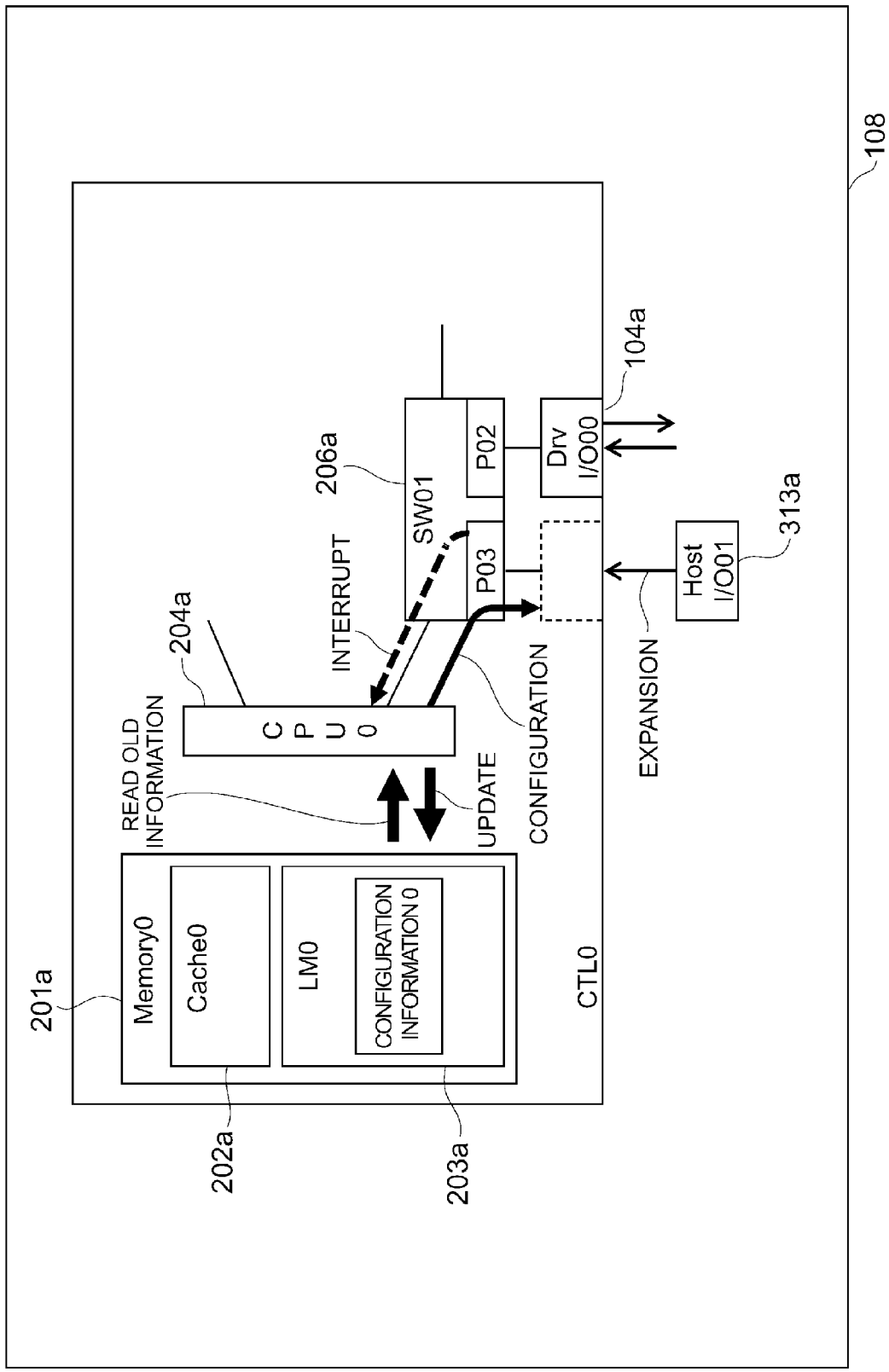
FIG. 8 is a block diagram explaining processing for adding an I/O module.

FIG. 8 is a diagram showing an example of processing executed when an I/O module is added. FIG. 8 shows the case where a host I/O module 313a is added to the I/O port P03 of the second switch unit 206a for the first controller 101a. Incidentally, FIG. 8 shows only the parts necessary for explanation, and the parts not specifically explained are omitted in the drawing. The following explanation will be given with reference to, for example, FIG. 2.

The processor 204a manages the devices in the first controller 101a and also manages devices such as added I/O modules. If the I/O module 313a is connected to the I/O port P03, the second switch unit 206a generates an interrupt. Specifically speaking, the second switch unit 206a notifies the processor 204a of the addition of the I/O module. This interrupt contains information for identifying the I/O port (such as the I/O port P03) to which the I/O module is added. An example of this information is an MSI (Message Signaled Interrupt) vector number. The information for identifying the I/O port is transferred to the processor 204a for the first controller 101a on which the second switch 206a which has generated the interrupt is mounted.

As triggered by the generation of the interrupt, the processor 204a identifies the I/O port P03, to which the I/O module is added, based on, for example, the MSI. The processor 204a performs configuration of the host I/O module 313a via the identified I/O port P03.

The configuration involves, for example, initialization of a connection bus (such as PCI-Express) between the I/O port P03 and the I/O module 313a, activation of a communication protocol, identification of a device that performs protocol control of a host I/O module or a drive I/O module on the I/O module 313a, initialization of the device, and activation processing.

Configuration will be explained below. In FIG. 8, at first, the processor 204a initializes the added I/O module. This initialization executed by the processor 204a involves, for example, reset of the bus between the I/O port P03 and the I/O module 313a which is the expansion target, and reset of mounted on the I/O module 313a.

Furthermore, the processor 204a maps the access space for controlling the host I/O module 313a to the access space for the I/O port P03. Subsequently, the processor 204a accesses a specified area (address) in the access space and recognizes the type of the added I/O module 313a. If the PCI is applied, the processor 204a recognizes the type of the added I/O module 313a by accessing, for example, a Vender/Device ID Field.

The types of I/O modules are divided into two main types: a host interface and a drive interface. Examples of various protocols for the host interface include FC (Fibre Channel), iSCSI (Internet Small Computer System Interface), and FCoE (Fibre Channel over Ethernet); and examples of various protocols for the drive interface include FC, SAS (Serial Attached SCSI), and SATA (Serial Advanced Technology Attachment). Furthermore, the same type of protocols are classified into different groups according to performance and model types. The processor 204a identifies the type of the relevant I/O module in such details by means of configuration.

The processor 204a loads various protocol control programs (hereinafter referred to as the "control programs") into the memory 201a, depending on the identified type of the I/O module 313a. The processor 204a allocates resources necessary for the control programs. An example of such resources includes information necessary for control such as an interrupt specific to the I/O module 313a, the addition of which is detected by the interrupt described above. Such a control program corresponds to a device driver. Examples of various resources include PCI (Peripheral Component Interconnect) buses, devices, and function number, and IRQ (Interrupt Request).

After such configuration terminates, the processor 204*a* recognizes that the host I/O module 313*a* has been added to the I/O port P03 of the second switch unit 206*a*; and the processor 204*a* then updates configuration information 0 stored in the local memory 203*a*(LM0).

Details of Configuration Information 0

As shown in FIG. 7, the configuration information 0 includes a correspondence relationship between the switch units and the I/O ports in the controller, information about whether or not an I/O module has been added to each I/O port, and identification information about the types of the I/O modules. The types of the I/O modules also include not only the protocol described above, but also information for identifying the further detailed categories according to model types and performance.

When updating the configuration information 0 as shown in FIG. 8 as a result of addition of the host I/O module 313*a*, the processor 204*a* reflects the information about the host I/O module 313*a* only to the I/O port P03 of the second switch unit 206*a* (which corresponds to SW01 in the drawing) corresponding to the configuration information 0, while it does not reflect the information about the host I/O module 313*a* to other ports (such as P02). The configuration information 0 is retained in the local memory 203*a* (which corresponds to LM0 in the drawing). The processor 204*a* updates the configuration information 0 in the access space for the local memory 203*a* in FIG. 7 (corresponding to LM0 (CTL0) n FIG. 7).

Removal of I/O Module

Next, an example of an action of the first controller 101*a* to remove an I/O module will be explained below. The procedure for removing an I/O module is performed basically in the order reverse to the order of addition of an I/O module.

Firstly, a specified administrator operates an operating unit for the management apparatus 109 and designates the I/O module 313*a* to be removed. The management apparatus 109 notifies the storage apparatus 108 of designation information indicating the designated I/O module 313*a*. The processor 204*a* deletes information about the I/O module identified by the designation information from the configuration information 0. The processor 204*a* releases the control programs which have been already loaded and relate to the I/O module to be removed. As a result, the administrator can now physically remove the I/O module 313*a* from the relevant I/O port.

The above explanation refers to the processing executed by the first controller 101*a*. However, the processor 204*b* executes almost the same processing in the second controller 101*b* when an I/O module is added to, or removed from, the second controller 101*b*.

Management after Addition or Removal of I/O Module

Next, how the storage apparatus 108 manages addition (or removal) of an I/O module will be explained below. In the storage apparatus 108, the processor 204*a* mounted on the first controller 101*a* manages the memory 201*a*, the first switch unit 205*a* and the second switch unit 206*a*, as well as I/O modules such as the I/O module 313*a* connected to the first switch unit 205*a* and the second switch unit 206*a* mainly within the range of the controller, and also accesses and controls them. The system configuration management is performed for each controller with regard to, for example, all the I/O ports mounted on both the controllers 101*a*, 101*b*, and the I/O modules connected to such I/O ports. Furthermore, in this embodiment, more appropriate system configuration management is realized by verifying the system configuration consistency as detected by each controller.

The processor 204*a*, 204*b* generates configuration information for each controller. For example, the processor 204*a* generates the configuration information 0 about the first controller 101*a*, and the processor 204*b* generates the configuration information 1 about the second controller 101*b*. At least one of the processors 204*a*, 204*b* generates system configuration information about both the controllers based on both pieces of the configuration information 0 and configuration information 1. Each processor 204*a*, 204*b* verifies the system configuration based on the system configuration information as described below in light of the system configuration rules described earlier. Incidentally, this verification is also referred to as the consistency verification in this embodiment.

(4) Interface Expansion Authentication Method for Storage Apparatus 108

Next, creation and check of the system configuration information, and management of the I/O modules connected to the storage apparatus 108 will be explained with reference to FIGS. 9 and 10.

Figure 9:
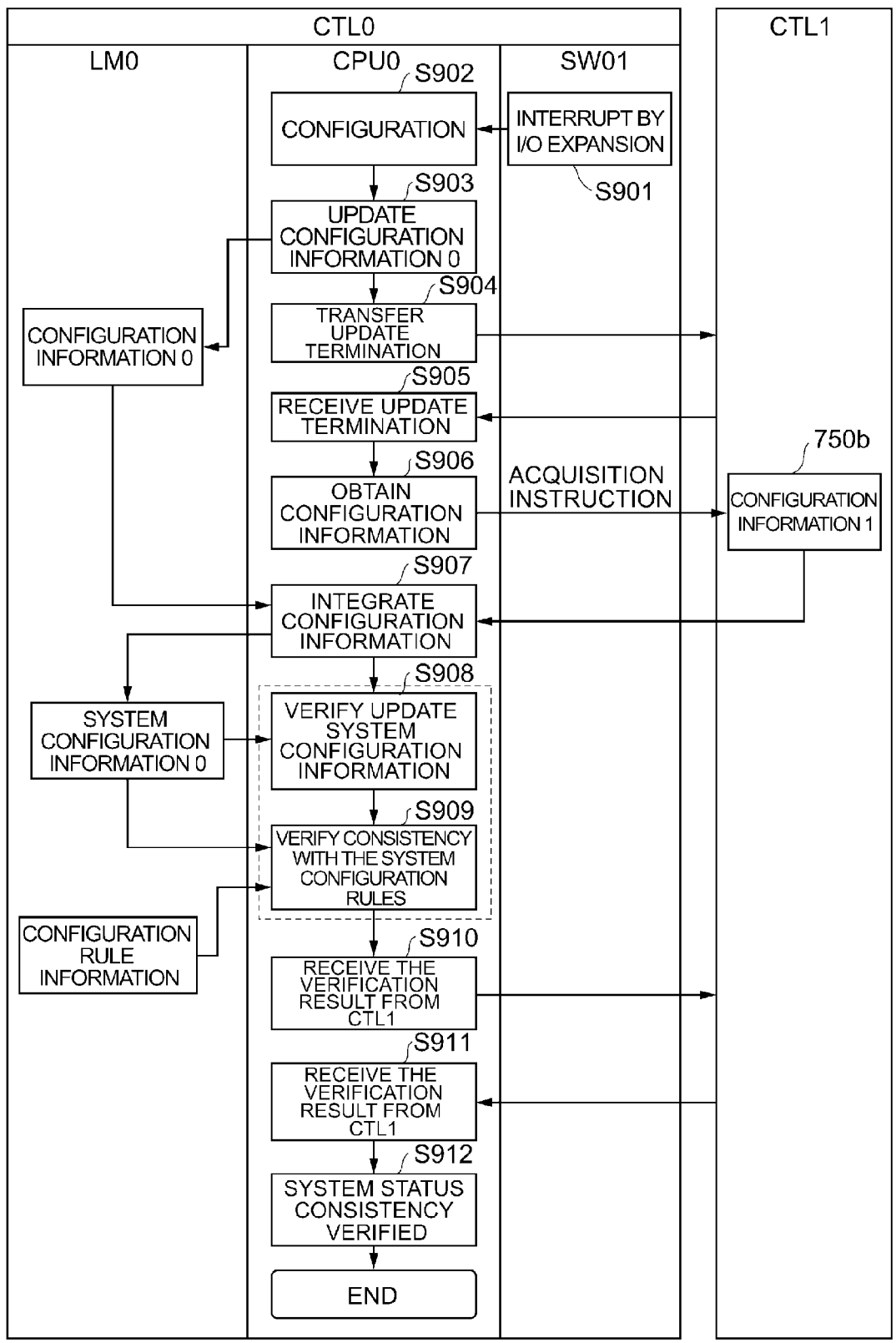
FIG. 9 is a flowchart illustrating an example of an interface expansion verification method for the storage apparatus.
Figure 10:
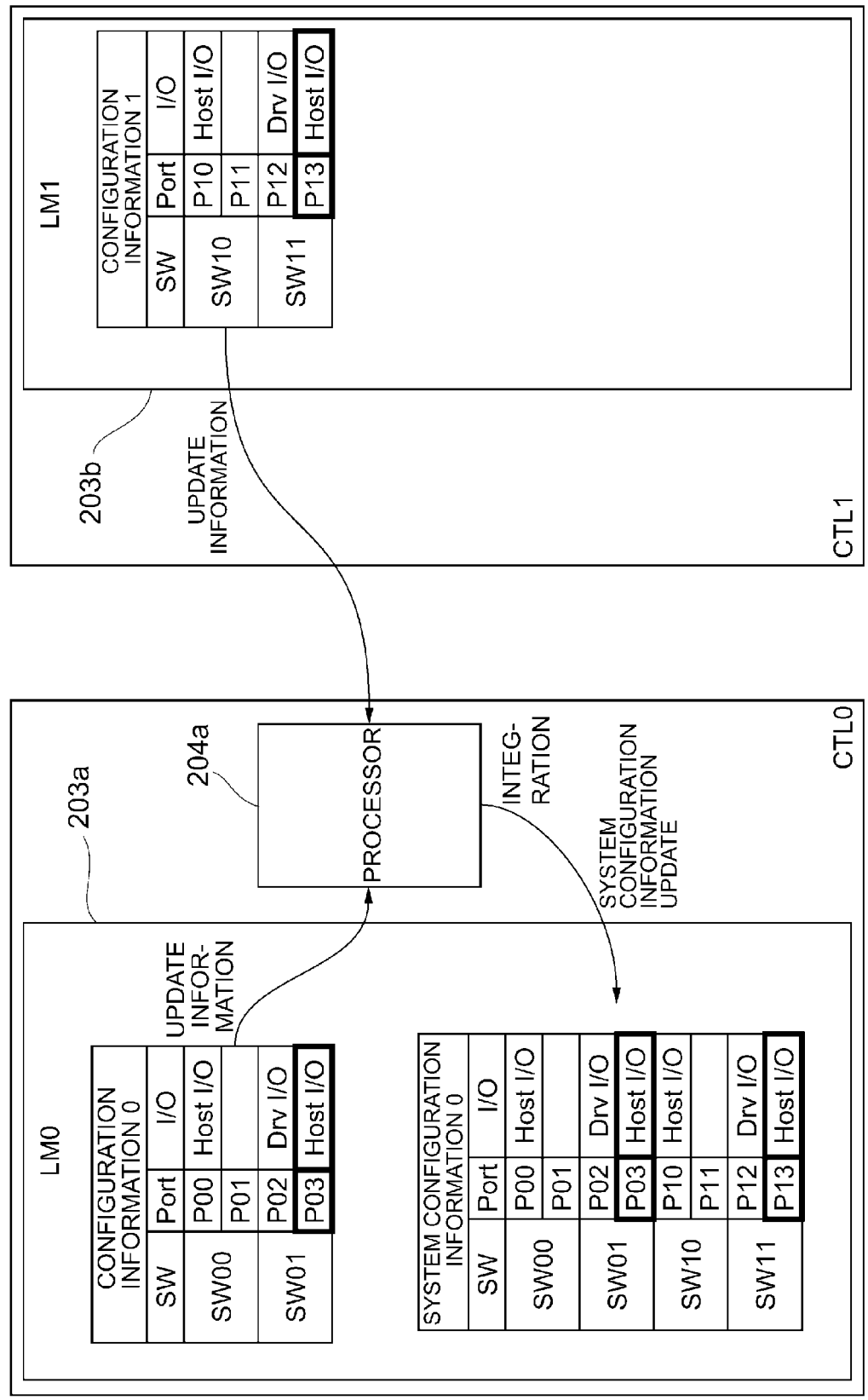
FIG. 10 shows how system configuration information is generated.

FIG. 9 is a flowchart illustrating an example of an authentication method used when an interface is added to the storage apparatus 108. Incidentally, the left side of FIG. 9 shows the procedures performed by the first controller 101*a* (which corresponds to CTL0 in the drawing), while the right side of FIG. 9 shows the procedures performed by the second controller 101*b* (which corresponds to CTL1 in the drawing). FIG. 10 shows how the configuration information and the system configuration information about each controller 101*a*, 101*b* are updated.

An interface expansion authentication method used for the storage apparatus 108 will be explained below also with reference to FIG. 8 and other drawings by selecting mainly the first controller 101*a* as an example. When an I/O module is first connected to an I/O port of the second switch unit 206*a* to add the I/O module, the second switch unit 206*a* generates an interrupt against the processor 204*a* in step S901 shown in FIG. 9. Incidentally, the I/O module expansion is also performed in the second controller 101*b* in response to the expansion at the first controller 101*a*. Next, in step S902, the processor 204*a* performs configuration as described earlier. In step S903, the processor 204*a* updates the configuration information 0 stored in the local memory 201*a* (LM0). In this step, the processor 204*a* updates the configuration information 0 by writing information indicating, for example, the addition of the I/O module to the I/O port to the configuration information 0.

After updating the configuration information 0, the processor 204*a* notifies the second controller 101*b* of completion of the update of the configuration information 0 in step S904. Incidentally, the processor 204*b* for the second controller 101*b* also executes processing for updating the configuration information 1 in the same manner. The first controller 101*a* waits for completion notice of the update of the configuration information 1 from the second controller 101*b*. After receiving such notice, the first controller 101*a* proceeds with the following processing.

The reason the processor 204*a* waits for the above-described notice is in order to avoid permitting data transfer to the newly added I/O modules by preventing the processor 204*a* from updating the system configuration information until the I/O modules are added to both the controllers 101*a*, 101*b*, and the configuration and both of the configuration information 0 and 1 in each controller 101*a*, 101*b* are updated.

If the addition of the I/O module is incomplete due to, for example, the occurrence of a failure in one of the first controller 101*a* and the second controller 101*b*, the processor 204*a* can prevent the data transfer action from starting in the state where the connection configuration of the I/O modules to the relevant I/O ports does not follow the first system configuration rule, the second system configuration rule, or the third system configuration rule, that is, where the storage apparatus 108 is in an inappropriate I/O module expansion state.

When the first controller 101*a* receives the aforementioned update completion notice from the second controller 101*b* in step S905, the processor 204*a* for the first controller 101*a* resumes processing for managing the system configuration as described below.

As described above, the local memory 203*a* (LM0) for the first controller 101*a* stores the configuration information 0 about the first controller 101*a*, while the local memory 203*b* (LM1) for the second controller 101*b* stores the configuration information 1 about the second controller 101*b*. In the first controller 101*a*, a host I/O module is added to the I/O port P03 of the second switch unit 206*a* (SW01). Meanwhile, in the second controller 101*b*, a host I/O module is added to the I/O port P13 of the second switch unit 206*b* (SW11). These pieces of configuration information 0 and 1 are updated by the processor 204*a* as described below.

In step S906, the processor 204*a* for the first controller 101*a* first obtains the configuration information 1 from the local memory 203*b* (which corresponds to LM1 in the drawing) for the second controller 101*b*. In step S907, the processor 204*a* integrates the configuration information 1 with the configuration information 0, thereby generating the system configuration information. This system configuration information contains the connection configuration of the I/O modules for all the I/O ports in the first controller 101*a* and the second controller 101*b* as described earlier. The processor 204*a* stores and updates the system configuration information in the local memory 203*a* (which corresponds to LM0 in the drawing) for the first controller 101*a*. As shown in FIG. 10, the system configuration information contains information about the connection state of I/O modules for all the I/O ports in both the controllers 101*a*, 101*b* and information for identifying the types of the I/O modules.

In step S908, the processor 204*a* reads the updated system configuration information from the local memory 203*a* (LM0), and verifies the I/O module connection status based on the system configuration information. Specific details of step S908 will be described later.

In step S909, the processor 204*a* recognizes the connection status of the I/O modules to the I/O ports based on the system configuration information and verifies whether or not the connection configuration consistency is secured according to the system configuration rules. Specific details of step S909 will be described later. In these steps S908 and S909, the processor 204*a* performs verification to permit data transfer using the I/O ports only if the current connection configuration matches any of the specified connection configurations in light of the system configuration rules.

Incidentally, in this embodiment, the first system configuration rule, the second system configuration rule, and the third system configuration rule shown in FIG. 12A to 12C respectively are set as the system configuration rules used in step S909. These rules are information which defines the specified connection configurations about I/O modules to be connected to each of the I/O ports of the first switch unit 205*a* and the second switch unit 205*b* as described above, and is stored in the memory 201*a*. The connection configuration of the I/O modules connected to the I/O ports according to each system configuration rules has already been explained and thereby omitted.

Figure 11:
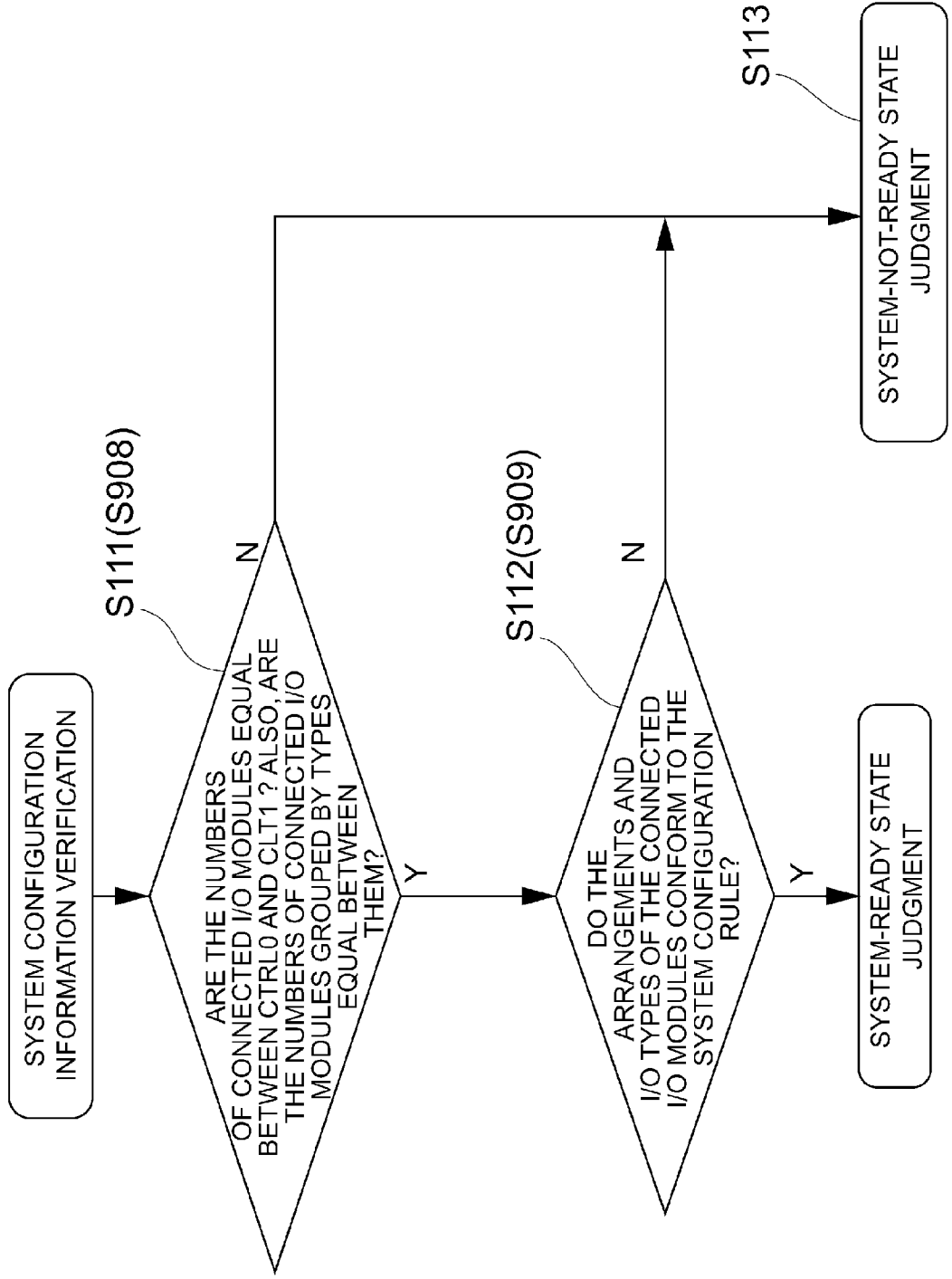
FIG. 11 is a flowchart illustrating an operation example when the system configuration is changed.

The above-described step S908 corresponds to step S111 shown in FIG. 11, while the above-described step S909 corresponds to step S112. Incidentally, CTL0 and CTL1 in FIG. 11 are respectively abbreviations for the first controller 101*a* and the second controller 101*a*. In step S111, the processor 204*a* first checks whether or not the number of I/O modules connected to the first controller 101*a* is equal to the number of I/O modules connected to the second controller 101*b*. Also in step S111, the processor 204*a* further checks whether or not the number of I/O modules connected to the first controller 101*a* and grouped by types is equal to the number of I/O modules connected to the second controller 101*b* and grouped by types.

If the above-described condition is not satisfied in step S111, the processor 204*a* determines that the connection status of the I/O modules to the I/O ports is not desirable (system-not-ready state), and then prohibits data transfer using the relevant the I/O ports.

On the other hand, if the above-described condition is satisfied in step S111, the processor 204*a* executes step S112. This step S112 corresponds to the above-described step S909. In step S112, the processor 204*a* verifies whether or not the connection configuration of the I/O modules connected to the I/O ports is in a designated connection configuration in light of the system configuration rule.

This verification checks whether or not the I/O modules for each switch in each controller 101*a* and 101*b* are located in the I/O ports at the specified positions. Furthermore, this verification checks whether or not the type of the I/O module connected to the relevant I/O port is the same as the type of the I/O module specified for the I/O port at the same position according to the selected system configuration rule. If the condition is satisfied in step S112, the processor 204*a* transits to the system-ready state where the storage apparatus 108 can transfer data via the added I/O module(s).

Furthermore, if the conditions in step S111 and S112 as shown in FIG. 11 are not satisfied, the processor 204*a* may transfer data in a conditional ready state described later instead of the system-not-ready state according to this embodiment. This means that the processor 204*a* permits data transfer via the I/O ports when the predetermined conditions are satisfied, even if the current connection configuration does not match any of the specified connection configurations according to the system configuration rules.

Specifically speaking, if the current connection configuration does not match any of the specified connection configurations according to the system configuration rules, the processor 204*a* outputs an output signal for displaying at least the unmatched connection configuration to the management apparatus 109. The "unmatched connection configuration" herein used is just an example, and the connection configuration of the I/O modules connected to all the I/O ports may be displayed as shown in the display content of a management screen described later as shown in FIG. 13. Subsequently, as triggered by input of a specified operation signal from the management apparatus 109 in accordance with the operating unit operated by the system administrator, the processor 204*a* permits data transfer via the I/O ports.

With this arrangement, even if the connection configuration of the I/O modules connected to the I/O ports is not identical to the specified connection configuration, but no particular problem occurs when the data transfer is started depending on the connection configuration, It is possible to efficiently transfer data by making effective use of part of the resources for the storage apparatus 108.

If the connection of any I/O module, which is not specified in the selected system configuration rule, to the I/O port to which another I/O module is connected is detected during the consistency verification described above, the processor 204a transits to such a conditional ready state described above. Incidentally, the processor 204a does not perform consistency check of an I/O port where the connection of the I/O module is not specified according to the system configuration information. Furthermore, the processor 204a may perform the verification of the system configuration information detected in the controller (step S111) and the verification of consistency with the system configuration rules (step S112) simultaneously in one step, instead of performing the verification procedures individually as separate steps as described above.

In steps S910 to S912 shown in FIG. 9, the verification result of the controller 101a is compared with that of the controller 101b, and whether the verification result of the controller 101a corresponds with that of the controller 101b is verified. In step S910, the processor 204a for the first controller 101a notifies the second controller 101b of the above verification result. In step S911, the processor 204a for the first controller 101a receives the verification result from the second controller 101b. In step S912, the processor 204a compares the system configuration information about the first controller 101a with the system configuration information about the second controller 101b, and verifies whether these pieces of system configuration information are identical or not.

With this arrangement, it is possible to prevent the processor 204a from setting the storage apparatus 108 in the system-ready state and permitting data transfer the first controller 101a and the second controller 101b in the state where the current connection configuration of the I/O modules is not consistent with the specified connection configuration. Incidentally, when the processor 204a sets the system-not-ready state, it is possible that a failure might have occurred in either or part of the first controller 101a and the second controller 101b. If the above-described verification procedures are performed, it is possible to detect, before activation, that the storage apparatus 108 has not achieved reliability as a storage apparatus, and it is also possible to detect in advance any presumable problems, such as data transfer failures or a failure to fully exhibit the performance in response to access from the host system 110, that may occur after activation of the storage apparatus 108. Examples of the failures herein mentioned may include hardware failures or control software deficiency.

By performing the above-described consistency verification, the storage apparatus 108 can perform more reliable verification when expanding the I/O modules. At the end of the processing of the above-described step S909, the processor 204a determines the system status (whether the system-ready state, the conditional ready state, or the system-not-ready state) and then permits or prohibits data transfer via the added I/O module(s). However, the timing of the above processing is not limited to the example explained above, and the processor 204a may determine the final system status and then permits or prohibits data transfer after finishing the processing in step S912.

Conditional Ready State

If the processor 204a determines that the system status should be the conditional ready state in the above step, this means that the system configuration information of the storage apparatus 108 which has been updated by adding the I/O module(s) is not consistent with the system configuration rule. Possible situations of this case will be explained below.

The first state may be the case where, for example, the number of I/O modules for the controller 101a should be originally the same as that for the controller 101b, but the number of I/O modules capable of data transfer for the controller 101a is not actually the same as that for the controller 101b. The possible reason why the numbers of the I/O modules for the controllers 101a, 101b are not the same may be because even if the same number of I/O modules is added to each controller 101a, 101b, configuration at each controller 101a, 101b might not have ended normally with regard to the I/O module added to one controller 101a.

Another possible reason why the numbers of the I/O modules for the controllers 101a, 101b are not equal may be because the user handling the storage apparatus 108 has added the I/O module only to one controller 101a intentionally or by mistake. On a side note, examples of possible causes for failure in configuration include insufficient connection between the controller main body and the I/O module, disconnection, and the occurrence of a failure on the device for controlling the communication protocol for communication with the host system 110 or the storage device 106.

The second state may be the case where different types of I/O modules have been added by mistake. A possible example would be the case where one of the I/O modules connected to the host system 110 is FC, but the other I/O module connected to the host system 110 is iSCSI. The third state may be the case where the I/O modules, for example, on which devices that have different types of transfer performance each other, are mounted to the I/O ports even with the same protocol type Even when the storage apparatus 108 is in the system-not-ready state, data transfer to and from the host system 110 may be permitted with a certain degree of performance, instead of expecting the storage apparatus 108 to give its best performance under the maximum load. In this case, when the system administrator operates the management screen on the management apparatus 109 as described later, the processor 204a causes the storage apparatus 108 to transit to the system-ready state under certain conditions and permits data transfer using only the I/O modules for which configuration has been normally performed.

Manual Data Transfer Permission

FIG. 13 is a diagram showing a management screen 950 as an example of a screen displayed on a display unit for the management apparatus 109. As described above, the management apparatus 109 is connected to the storage apparatus 108 and is equipped with a processor (not shown in the drawing), the display unit, and the operating unit such as a mouse that can be operated by, for example, the administrator. The above-mentioned processor communicates with the first controller 101a and the second controller 101b for the storage apparatus 108 and obtains the system configuration information from the storage apparatus 108. The processor displays the management screen 950 on the display unit based on a signal from the processor 204a for the storage apparatus 108.

The content of the management screen 950 is based on, for example, the system configuration information obtained above. The processor displays a pointer etc., on the management screen 950, and displays and places the content based on the operation with the above-mentioned operating unit over the management screen 950. The processor outputs the operation signal based on the operation with the operating unit to the storage apparatus 108.

The management screen 950 has radio buttons 951, an update button 952, a status display area 953, a display area 954, and an area 955. The radio button 951 is an object for selecting the system configuration rule. One of the aforementioned first to third system configuration rules is selectable here. The update button 952 is an object that permits to apply the system configuration rule selected by the radio button 951 to the apparatus. The status display area 953 is a display area for displaying the current system status. The display area 954 is a display area for displaying the arrangement of the I/O modules according to the selected system configuration rules. The area 955 is a display area for displaying the current system configuration.

When one of the radio buttons 951 is selected by operating the specified pointer, the system configuration rule corresponding to that radio button 951 is selected. When the operation button 952 is pressed after the system configuration rule is selected, the system configuration rule selected as above is applied to the relevant storage apparatus 108. The selected system configuration rule is applied to both the controllers (the first controller 101a and the second controller 101b). When the system configuration rule is newly applied, the display area 954 is updated by the processor so that it will display the content according to the selected system configuration rule.

Furthermore, the processor for the management apparatus 109 updates the status of the storage apparatus 108 from time to time by periodically communicating with each controller 101a, 101b for the storage apparatus 108, and displays the current system configuration as a result of the I/O module expansion on the display area 955. The display area 953 is an area for displaying the system status. The display area 953 displays that the system status is "system-ready"; however, the display area 953 may display another state, that is, "conditional ready" or "system-not-ready" as described earlier. This display area 953 may also display "during configuration" or "configuration completed" at the time of the I/O module expansion. Incidentally, instead of displaying each system state individually in the display area 953, the processor may also display all the system states that can be displayed, side by side in the display area 953 and highlight the item indicating the current system status.

The operation button 956 is operated when setting the storage apparatus 108 to the conditional ready state. If the operation button 956 is pressed as designated by the system administrator by operating the operating unit, the processor outputs the specified operation signal to the storage apparatus 108. The conditional ready state as described above is a mode in which even if the current connection configuration is not consistent with the system configuration rule, the storage apparatus 108 is forced to transit to the system-ready state. If the storage apparatus 108 is set by the processor 204a to the conditional ready state, the storage apparatus 108 can transfer data via the I/O modules that are properly connected to the I/O ports and the configuration is proper.

(5) Other Embodiments

The above-described embodiments are examples given for the purpose of describing this invention, it is not intended to limit the invention only to the embodiments. Accordingly, this invention can be utilized in various ways unless the utilizations depart from the gist of the invention. For example, processing sequences of various programs have been explained sequentially in the embodiment described above; however, the order of the processing sequences is not particularly limited to those described above. Therefore, unless any conflicting processing result is obtained, the order of processing may be changed or concurrent operations may be performed.

The management apparatus 109 may be changed to various forms in the embodiment described above. For example, what should be displayed on the management screen is not limited to the system configuration, format, and letters shown in FIG. 13, and the processor for the management apparatus 109 may display other content on the management screen 950 as long as it displays the information similar to those shown in FIG. 13. The processor may display the current system configuration in the display area 955 on the management screen 950 by highlighting an I/O port(s) that is not consistent with the system configuration rules displayed on the display area 954 as a result of verification of consistency with the system configuration rules. Furthermore, if the relevant I/O port is not consistent with the system configuration rules, the processor may display the cause of inconsistency and how to deal with the inconsistency issue in a message display area (message window) 957 at the bottom of the management screen 950.

The invention claimed is:

1. A storage apparatus having first and second controllers for controlling data transfer between a host system and a storage device,
the first and second controllers respectively comprising:
a first switch unit and a second switch unit, each of the switch units is equipped with a first port for connecting either an interface unit for the host system or an interface unit for the storage device, and a second port for connecting the first controller with the second controller, and which permits or prohibits data transfer using each of the first port and the second port;
a processor configured to control data transfer with the host system or the storage device via a respective of the first ports, while controlling data transfer between the first controller and the second controller via a respective second port, by controlling the first or the second switch unit; and
a memory configured to store system configuration rules;
wherein the first and second controllers are connected to each other via:
a first path for connecting the second port of the first switch unit in the first controller to the second port of the first switch unit in the second controller; and
a second path independent of the first path, for connecting the second port of the second switch unit in the first controller to the second port of the second switch unit in the second controller,
wherein the system configuration rules set kinds of I/O modules which are physically positioned to respective of the first ports of the first and second switch units;
wherein the processor is configured to verify the consistency of a current system configuration of each of the first ports of the first and second switch unit according to a currently set one of the system configuration rules.

2. The storage apparatus according to claim 1, wherein the first or second switch unit is provided with a plurality of the first ports.

3. The storage apparatus according to claim 2, wherein the interface units on the host system are connected and the storage device is connected to the first ports for at least one of the first and second switch units.

4. The storage apparatus according to claim 2, wherein the interface units for the host system or the storage device are connected to the plurality of the first ports for the first or second switch unit.

5. The storage apparatus according to claim 2, wherein, regarding the first and second controllers,
the interface unit of the host system is connected to any of the plurality of the first ports of the first switch unit, while the interface unit of the storage device is connected to any of the plurality of the first ports of the second switch unit; or the interface unit of the storage device is connected to any of the plurality of the first ports of the first switch unit, while the interface unit of the host system is connected to any of the plurality of the first ports for the second switch unit.

6. The storage apparatus according to claim 2, wherein in the first and second controllers, the number of the interface units connected to the plurality of the first ports of the first or second switch unit of the first controller is equal to the number of the interface units connected to the plurality of the first ports of the first or second switch unit of the second controller.

7. The storage apparatus according to claim 1, wherein the processor obtains a connection configuration of the interface unit connected to each first port of the first or second switch unit;

the first controller and the second controller respectively comprise a memory unit for storing configuration information representing a current connection configuration obtained by the processor; and in at least one of the first controller and the second controller, a respective processor generates system configuration information including the connection configurations of the interface units for all the first ports of the first and second controllers based on both of the configuration information about the first and second controllers, and stores an obtained system configuration information in the memory unit.

8. The storage apparatus according to claim 7, wherein if the current connection configuration matches any of the specified connection configurations in light of respective of the system configuration rules, the processor is configured to permit data transfer using the first ports.

9. The storage apparatus according to claim 8, wherein if the current connection configuration does not match any of the specified connection configurations, but satisfies a predetermined condition, the processor is configured to permit data transfer using the first ports.

10. The storage apparatus according to claim 9, wherein if the current connection configuration does not match any of the specified connection configurations, the processor is configured to output an output signal for displaying at least the unmatched connection configuration; and thereafter, when triggered by input of a specified operation signal as the predetermined condition, the processor permits data transfer using the first ports.

11. The storage apparatus according to claim 10, wherein the processor outputs a signal, as the output signal, for displaying the current connection configuration on a display unit for a management apparatus for externally operating the storage apparatus; and when triggered by input of the specified operation signal which is output in response to the operation of an operating unit for the management apparatus, the processor is configured to permit data transfer using the first ports.

12. An interface expansion authentication method for a storage apparatus having first and second controllers for controlling data transfer between a host system and a storage device, the interface expansion authentication method comprising:
an acquisition step executed by respective processors of the first and second controllers, for obtaining a current connection configuration of an interface unit connected to respective first ports of first and second switch units where the respective first ports connect each interface unit of the host system and the storage device;
a generation step executed by a respective of the processors, for generating system configuration information about a connection configuration of the interface units for all the first ports of the first and second controllers based on system configuration information about both the first and second controllers;
a verification step executed by a respective of the processors, for verifying a current connection configuration by comparing system configuration rules, wherein the system configuration rules set kinds of I/O modules which are physically positioned to respective of the first ports of the first and second switch unit, about a specified connection configuration of the interface unit to be connected to each first port of the first or second switch unit with the system configuration information; and
a control step executed by a respective of the processors, for permitting or prohibiting data transfer using each first port of the first or second switch unit based on the verification result in the verification step.

13. The interface expansion authentication method for the storage apparatus according to claim 12, wherein in the control step, if the current connection configuration does not match any of specified connection configurations, the processor outputs an output signal tier displaying at least the unmatched connection configuration; and thereafter, when triggered by input of a specified operation signal as the predetermined condition, the respective processor permits data transfer using the first ports.

* * * * *